United States Patent
Schuster et al.

(10) Patent No.: US 6,650,901 B1
(45) Date of Patent: Nov. 18, 2003

(54) SYSTEM AND METHOD FOR PROVIDING USER-CONFIGURED TELEPHONE SERVICE IN A DATA NETWORK TELEPHONY SYSTEM

(75) Inventors: Guido M. Schuster, Des Plaines, IL (US); Jacek A. Grabiec, Chicago, IL (US); Ikhlaq S. Sidhu, Vernon Hills, IL (US); Jerry J. Mahler, Prospect Heights, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/515,366

(22) Filed: Feb. 29, 2000

(51) Int. Cl.⁷ ............................ H04Q 7/20; H04M 11/00
(52) U.S. Cl. ........................ 455/456; 455/404; 379/45
(58) Field of Search ............................... 455/404, 461, 455/425, 432, 433, 436, 440, 424, 575, 456, 457; 370/352, 338, 389, 401, 392, 474, 475; 340/7.29; 379/37, 45

(56) References Cited

U.S. PATENT DOCUMENTS

| | | |
|---|---|---|
| 4,313,035 A | 1/1982 | Jordan et al. |
| 4,953,198 A | 8/1990 | Daly et al. .................... 379/61 |
| 4,973,837 A | 11/1990 | Bradbeer |
| 5,297,191 A | 3/1994 | Gerszberg |
| 5,311,582 A | 5/1994 | Davenport et al. |

(List continued on next page.)

FOREIGN PATENT DOCUMENTS

| | | |
|---|---|---|
| DE | 198 13 179 A 1 | 9/1999 |
| EP | 0 578 374 A1 | 6/1993 |
| EP | 0 704 788 A2 | 4/1996 |
| EP | 0 858 202 A2 | 2/1998 |
| EP | 0 869 688 A2 | 10/1998 |
| EP | 0 918 423 A2 | 10/1998 |
| EP | 0 881 848 A2 | 12/1998 |
| WO | WO95/34985 | 12/1995 |
| WO | WO 97/31492 | 8/1997 |
| WO | WO 97/33421 | 9/1997 |

(List continued on next page.)

OTHER PUBLICATIONS

U.S. patent application Ser. No. 09/451,388, Guido M. Schuster et al., filed Nov. 30, 1999.
U.S. patent application Ser. No. 09/406,231, Guido M. Schuster et al., filed Sep. 27, 1999.
U.S. patent application Ser. No. 09/515,365, Guido M. Schuster et al., filed Feb. 29, 2000.
U.S. patent application Ser. No. 09/406,320, Guido M. Schuster et al., filed Sep. 27, 1999.

(List continued on next page.)

*Primary Examiner*—Quochien Vuong
(74) *Attorney, Agent, or Firm*—McDonnell Boehnen Hulbert & Berghoff

(57) ABSTRACT

A system and method for providing location information and other information about a calling telephone to the caller during a telephone connection in a data network telephony system. Data network telephones may be provisioned and otherwise configured for operation with an extensive database and other user account information. The user's account may include a location identifier that identifies the physical location of the telephone. The location identifier may provide address information, latitude and longitude configuration, directions, or other information. In one embodiment of the present invention, the location information is communicated in a data communications channel between the caller and the callee. In another embodiment of the present invention, the location information is communicated to the caller during call setup. The embodiments of the present invention are useful in providing emergency dispatch services, such as 911 in a data network telephony system.

13 Claims, 13 Drawing Sheets

U.S. PATENT DOCUMENTS

| | | | |
|---|---|---|---|
| 5,428,663 A | | 6/1995 | Grimes et al. |
| 5,448,623 A | | 9/1995 | Wiedeman et al. |
| 5,471,616 A | | 11/1995 | Johnson et al. |
| 5,497,339 A | | 3/1996 | Bernard ................. 364/705.05 |
| 5,557,658 A | | 9/1996 | Gregorek et al. ............. 379/67 |
| 5,563,937 A | | 10/1996 | Bruno et al. |
| 5,594,425 A | * | 1/1997 | Ladner et al. ......... 340/825.49 |
| 5,606,594 A | * | 2/1997 | Register et al. ............. 455/550 |
| 5,610,972 A | * | 3/1997 | Emery et al. ................ 455/414 |
| 5,646,945 A | | 7/1997 | Bergler |
| 5,697,060 A | * | 12/1997 | Akahane .................... 455/38.1 |
| 5,727,057 A | | 3/1998 | Emery et al. ................ 379/211 |
| 5,729,537 A | * | 3/1998 | Billstrom .................... 370/329 |
| 5,732,074 A | | 3/1998 | Spaur et al. |
| 5,732,216 A | | 3/1998 | Logan et al. |
| 5,742,905 A | * | 4/1998 | Pepe et al. .................. 455/461 |
| 5,793,762 A | * | 8/1998 | Penners et al. ............. 370/389 |
| 5,838,665 A | * | 11/1998 | Kahn et al. ................. 370/260 |
| 5,850,433 A | | 12/1998 | Rondeau .................... 379/201 |
| 5,875,405 A | | 2/1999 | Honda |
| 5,884,159 A | * | 3/1999 | Thro et al. .................. 455/412 |
| 5,894,473 A | | 4/1999 | Dent |
| 5,894,595 A | | 4/1999 | Foladare et al. ............ 455/414 |
| 5,915,008 A | | 6/1999 | Dulman ...................... 379/201 |
| 5,918,172 A | | 6/1999 | Saunders et al. ........... 455/404 |
| 5,930,700 A | | 7/1999 | Pepper et al. |
| 5,933,778 A | | 8/1999 | Buhrmann et al. ......... 455/461 |
| 5,938,757 A | | 8/1999 | Bertsch |
| 5,960,340 A | | 9/1999 | Fuentes |
| 5,970,059 A | | 10/1999 | Ahopelto et al. |
| 5,991,394 A | | 11/1999 | Dezonno et al. |
| 6,006,272 A | | 12/1999 | Aravamudan et al. |
| 6,020,916 A | | 2/2000 | Gerszberg et al. |
| 6,031,904 A | * | 2/2000 | An et al. .................... 370/352 |
| 6,044,403 A | | 3/2000 | Gerszberg et al. |
| 6,073,013 A | * | 6/2000 | Agre et al. .................. 455/428 |
| 6,075,992 A | | 6/2000 | Moon et al. |
| 6,084,584 A | | 7/2000 | Nahi et al. |
| 6,141,341 A | | 10/2000 | Jones et al. |
| 6,141,546 A | * | 10/2000 | Thomas et al. ............. 455/424 |
| 6,161,008 A | * | 12/2000 | Lee et al. .................... 455/414 |
| 6,161,134 A | | 12/2000 | Wang et al. |
| 6,163,598 A | | 12/2000 | Moore |
| 6,167,040 A | | 12/2000 | Haeggstrom |
| 6,167,261 A | * | 12/2000 | Amin .......................... 455/426 |
| 6,175,860 B1 | | 1/2001 | Gaucher |
| 6,188,688 B1 | | 2/2001 | Buskirk, Jr. |
| 6,212,261 B1 | | 4/2001 | Meubus et al. |
| 6,216,158 B1 | | 4/2001 | Luo et al. |
| 6,240,097 B1 | | 5/2001 | Weslock et al. |
| 6,266,539 B1 | | 7/2001 | Pardo |
| 6,301,609 B1 | | 10/2001 | Aravamudan et al. |
| 6,308,201 B1 | | 10/2001 | Pivowar et al. |
| 6,334,126 B1 | | 12/2001 | Nagatomo et al. |
| 6,337,858 B1 | | 1/2002 | Petty et al. |
| 6,359,892 B1 | | 3/2002 | Szlam |
| 6,385,308 B1 | | 5/2002 | Cohen et al. |
| 6,404,764 B1 | | 6/2002 | Jones et al. |
| 6,411,965 B2 | | 6/2002 | Klug |
| 6,414,962 B1 | | 7/2002 | Hall et al. |
| 6,418,198 B2 | | 7/2002 | Brablec et al. |
| 6,421,235 B2 | | 7/2002 | Ditzik |
| 6,445,697 B1 | | 9/2002 | Fenton |
| 6,448,978 B1 | | 9/2002 | Salvador et al. |
| 6,456,594 B1 | | 9/2002 | Kaplan et al. |
| 6,456,601 B1 | | 9/2002 | Kozdon et al. |
| 6,477,565 B1 | | 11/2002 | Daswani et al. |
| 6,477,576 B2 | | 11/2002 | Angwin et al. |
| 6,483,902 B1 | | 11/2002 | Stewart et al. |
| 6,493,338 B1 | | 12/2002 | Preston et al. |
| 6,496,477 B1 | | 12/2002 | Perkins et al. |
| 6,526,462 B1 | | 2/2003 | Elabd |
| 6,539,359 B1 | | 3/2003 | Ladd et al. |
| 2001/0022784 A1 | | 9/2001 | Menon et al. |
| 2001/0030950 A1 | | 10/2001 | Chen et al. |

FOREIGN PATENT DOCUMENTS

| | | | |
|---|---|---|---|
| WO | WO98/00988 | 1/1998 | |
| WO | WO 98/04065 | 1/1998 | |
| WO | WO98/10538 | 3/1998 | |
| WO | WO 99/45687 | 3/1998 | |
| WO | WO 98/16051 | 4/1998 | |
| WO | WO98/21911 | 5/1998 | |
| WO | WO 98/30008 | 7/1998 | |
| WO | WO 98/37665 | 8/1998 | |
| WO | WO 99/35802 | 1/1999 | |
| WO | WO 99/12365 | 3/1999 | |
| WO | 99/12365 * | 3/1999 | ............ H04Q/7/22 |
| WO | WO 99/19988 | 4/1999 | |
| WO | WO 01/05078 A2 | 7/2000 | |

OTHER PUBLICATIONS

U.S. patent application Ser. No. 09/515,797, Guido M. Schuster et al., filed Feb. 29, 2000.

U.S. patent application Ser. No. 09/515,364, Guido M. Schuster et al., filed Feb. 29, 2000.

U.S. patent application Ser. No. 09/405,283, Guido M. Schuster et al., filed Sep. 27, 1999.

U.S. patent application Ser. No. 09/515,798, Guido M. Schuster et al., filed Feb. 29, 2000.

U.S. patent application Ser. No. 09/584,924, Guido M. Schuster et al., filed May 31, 2000.

U.S. patent application Ser. No. 09/515,969, Guido M. Schuster et al., filed Feb. 29, 2000.

U.S. patent application Ser. No. 09/406,322, Guido M. Schuster et al., filed Sep. 27, 1999.

U.S. patent application Ser. No. 09/406,152, Guido M. Schuster et al., filed Sep. 27, 1999.

U.S. patent application Ser. No. 09/405,981, Guido M. Schuster et al., filed Sep. 27, 1999.

U.S. patent application Ser. No. 09/406,128, Guido M. Schuster et al., filed Sep. 27, 1999.

U.S. patent application Ser. No. 09/515,387, Guido M. Schuster et al., filed Feb. 29, 2000.

U.S. patent application Ser. No. 09/515,970, Guido M. Schuster et al., filed Feb. 29, 2000.

U.S. patent application Ser. No. 09/515,796, Guido M. Schuster et al., filed Feb. 29, 2000.

U.S. patent application Ser. No. 09/406,151, Guido M. Schuster et al., filed Sep. 27, 1999.

U.S. patent application Ser. No. 09/406,298, Guido M. Schuster et al., filed Sep. 27, 1999.

U.S. patent application Ser. No. 09/406,066, Guido M. Schuster et al., filed Sep. 27, 1999.

U.S. patent application Ser. No. 09/515,795, Guido M. Schuster et al., filed Feb. 29, 2000.

U.S. patent application Ser. No. 09/516,269, Guido M. Schuster et al., filed Feb. 29, 2000.

U.S. patent application Ser. No. 09/470,879, Guido M. Schuster et al., filed Dec. 22, 1999.

U.S. patent application Ser. No. 09/707,708, Guido M. Schuster et al., filed Nov. 7, 2000.

U.S. patent application Ser. No. 09/677,077, Guido M. Schuster et al., filed Sep. 29, 2000.

U.S. patent application Ser. No. 09/584,927, Guido M. Schuster et al., filed May 31, 2000.

U.S. patent application Ser. No. 09/726,993, Guido M. Schuster et al., filed Nov. 30, 2000.

U.S. patent application Ser. No. 09/728,833, Guido M. Schuster et al., filed Nov. 30, 2000.

Terry, Douglas B. et al. *Managing Stored Voice In the Etherphone System*, Operating Systems Review (SIGOPS), US, ACM Head Quarter, New York, NY. vol. 21, No. % (Nov. 8, 1987), pps. 103–104, XP 000005196.

Zellweger, Polle T. et al. *An Overview of the Etherphone System and Its Applications*, Xerox Palo Alto Research Center (Mar. 1988), pps. 160–168, XP 000617541.

Terry, Douglas B. et al. *Managing Stored Voice In the Etherphone System*, Xerox Palo Alto Research Center vol. 1, (Feb. 1998), pps. 3–27, XP 000032477.

International Search Report for PCT Application Ser. No. PCT/US00/26618, Dated Feb. 19, 2001.

Pepper, David J. et al., *The Call Manager System: A Platform for Intelligent Telecommunications Services*, Speech Communication, vol. 23, (1997), pps. 129–139.

Dalgic, Ismail et al., *True Number Portability and Advanced Call Screening in a SIP–Based IP Telephony System*, IEEE Communications Magazine, vol. 37, No. 7, (Jul. 1999), pps. 96–101.

International Search Report for PCT Application Ser. No. PCT/US00/26094, Dated Jan. 31, 2001.

International Search Report for PCT Application Ser. No. PCT/US00/26594, Dated Feb. 6, 2001.

Watanabe, H. et al., *Development of the BTRON–BrainPad*, Proceedings 13$^{th}$ Tron Project International Symposium, Online!, (Dec. 4–7, 1996), pps. 95–103.

Gessler, Stefan et al., *PDAs as Mobile WWW Browers*, Computer Networks and ISDN Systems, vol. 28, No. 1, (Dec. 1995), pps. 53–59.

International Search Report for PCT Application Ser. No. PCT/US00/26650, Dated Feb. 19, 2001.

International Search Report for PCT Application Ser. No. PCT/US00/41020, Dated Feb. 21, 2001.

Anquetil, L.P. et al., *Media Gateway Control Protocol and Voice IP Gateways. MGCP and VoIP Gatgeways Will Offer Seamless Interworking of New VoIP Networks with Todays's Telephone Networks*, Electrical Communication, (Apr. 1, 1999), pps. 151–157.

International Search Report for PCT Application Ser. No. PCT/US00/26649, Dated Feb. 6, 2001.

3COM SIP Solutions 1.0 benefits brochure. (4 total pages).

Sidhu, Ikhlaq and Bezaitis, Andrew, Eat or be eaten, www.americasnetwork.com/issues/99issues/991101/991191_eat.htm, printed May 10, 2000. (6 total pages).

Myers, Brad A.; Stiel, Herb; and Gargiulo, Robert, Collaboration Using Multiple PDAs Connected to a PC, Proceedings of the ACM 1998 conference on Computer supported cooperative work, Nov. 14–18, 1998, Seattle, WA. (total 11 pages).

Dalgic, Ismail; Borella, Michael; Dean, Rick; Grabiec, Jacek; Mahler, Jerry; Schuster, Guido; and Sidhu, Ikhlaq, True Number Portability and Advanced Call Screening in a SIP–Based IP Telephony System, *IEEE Communications Magazine*, vol. 37, No. 7, Jul. 1999, pp. 96–101. (8 total pages).

Handley/Schulzrinne/Schooler/Rosenberg, SIP: Session Initiation Protocol, Network Working Group, Request for Comments (RFC) 2543, Mar. 1999. (153 pages).

Handley/Schulzrinne/Schooler/Rosenberg, SIP: Session Initiation Protocol, Internet Engineering Task Force, draft–ietf–sip–rfc2543bis–02.ps. Sep. 4, 2000. (131 pages).

"Understanding Packet Voice Protocols"; The International Engineering Consortium; http://www.iec.org.

* cited by examiner

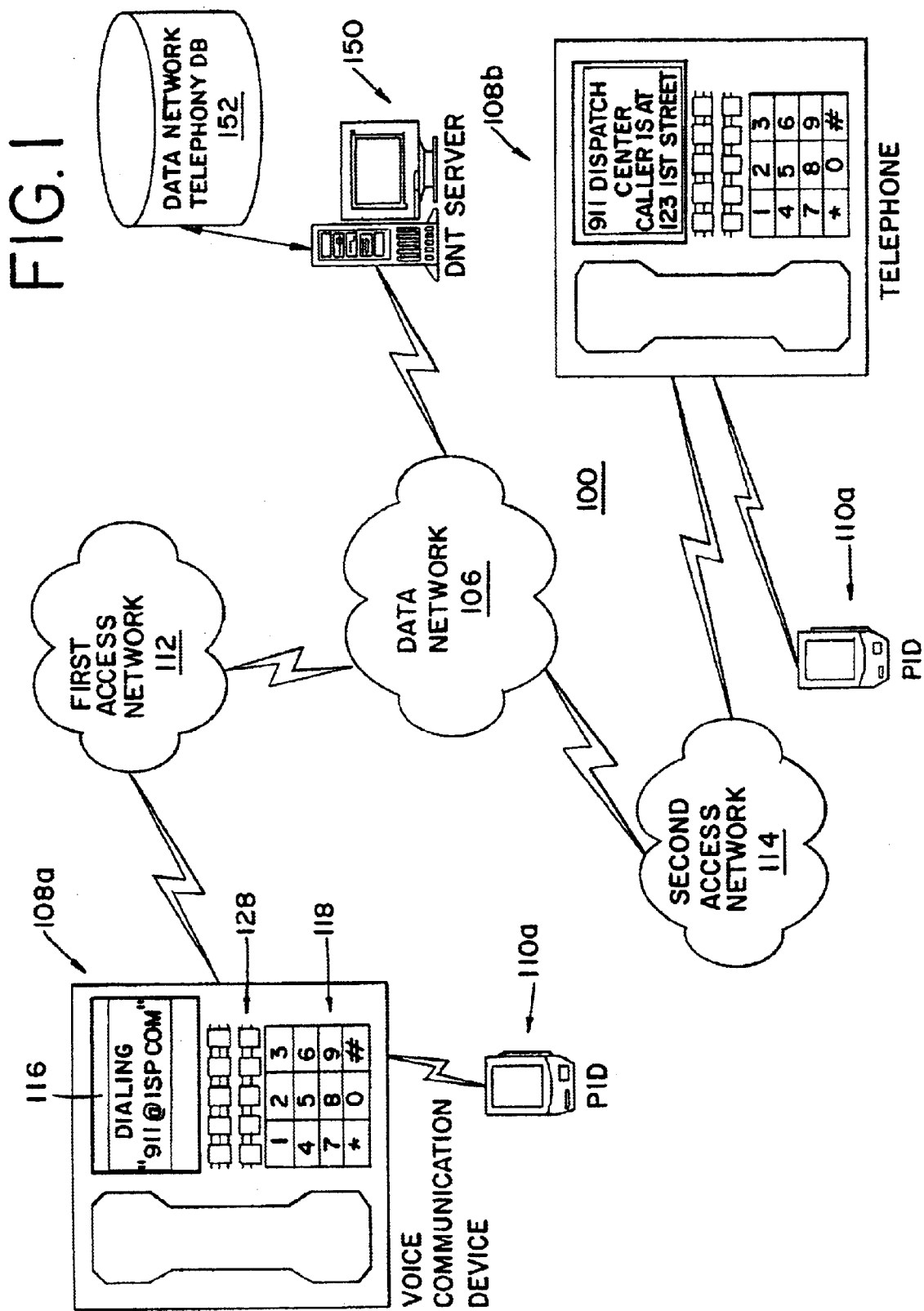

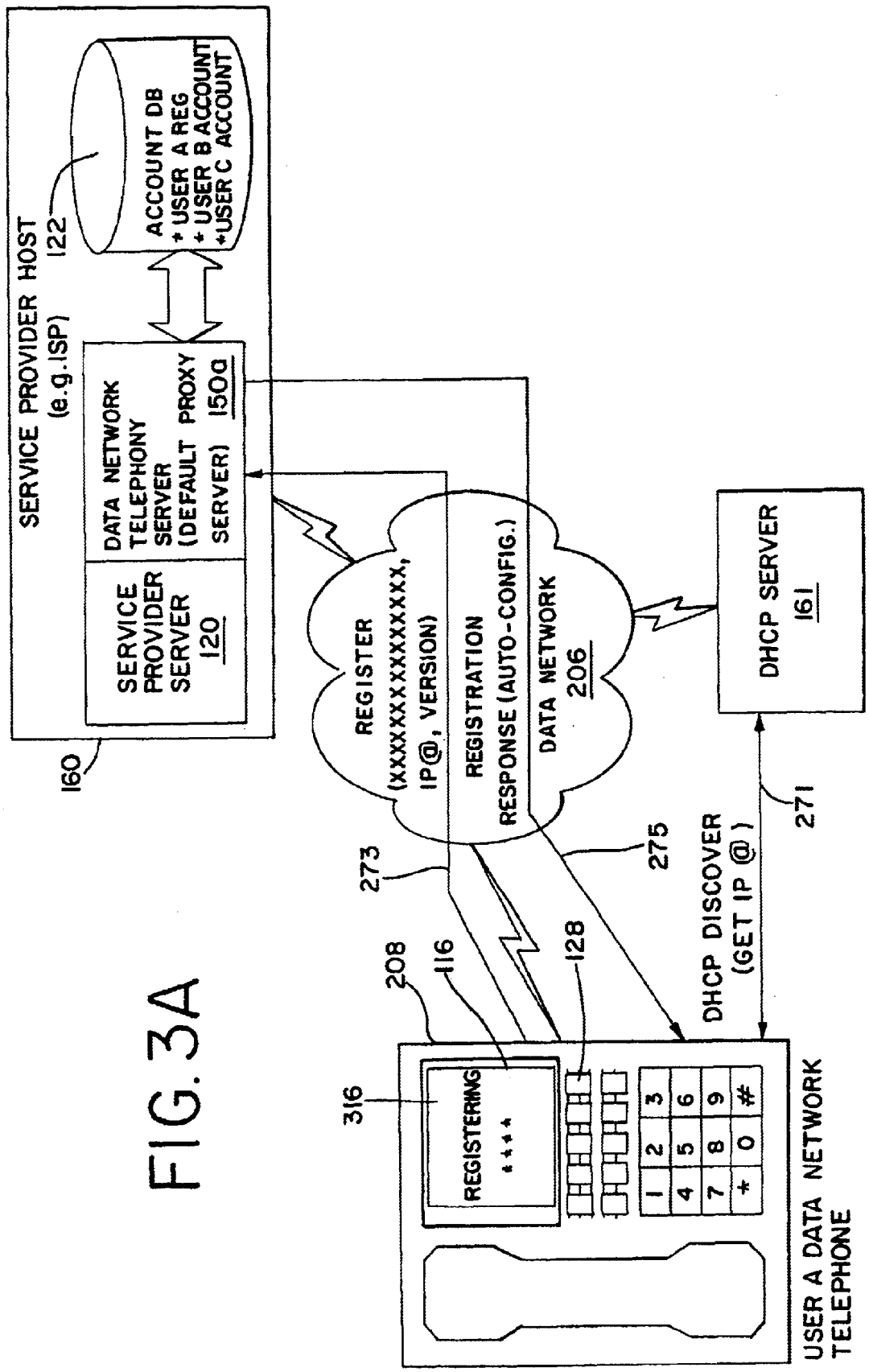

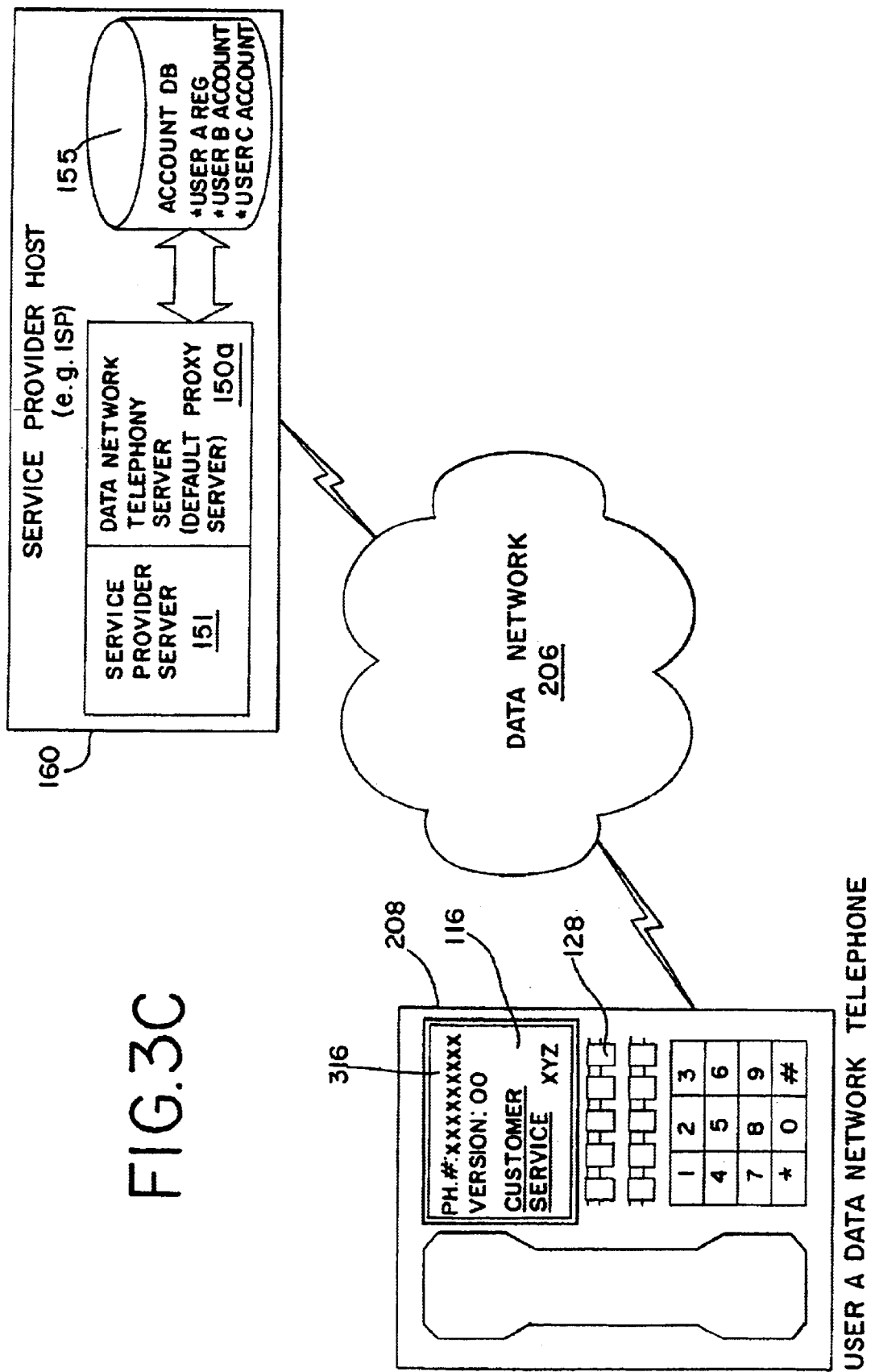

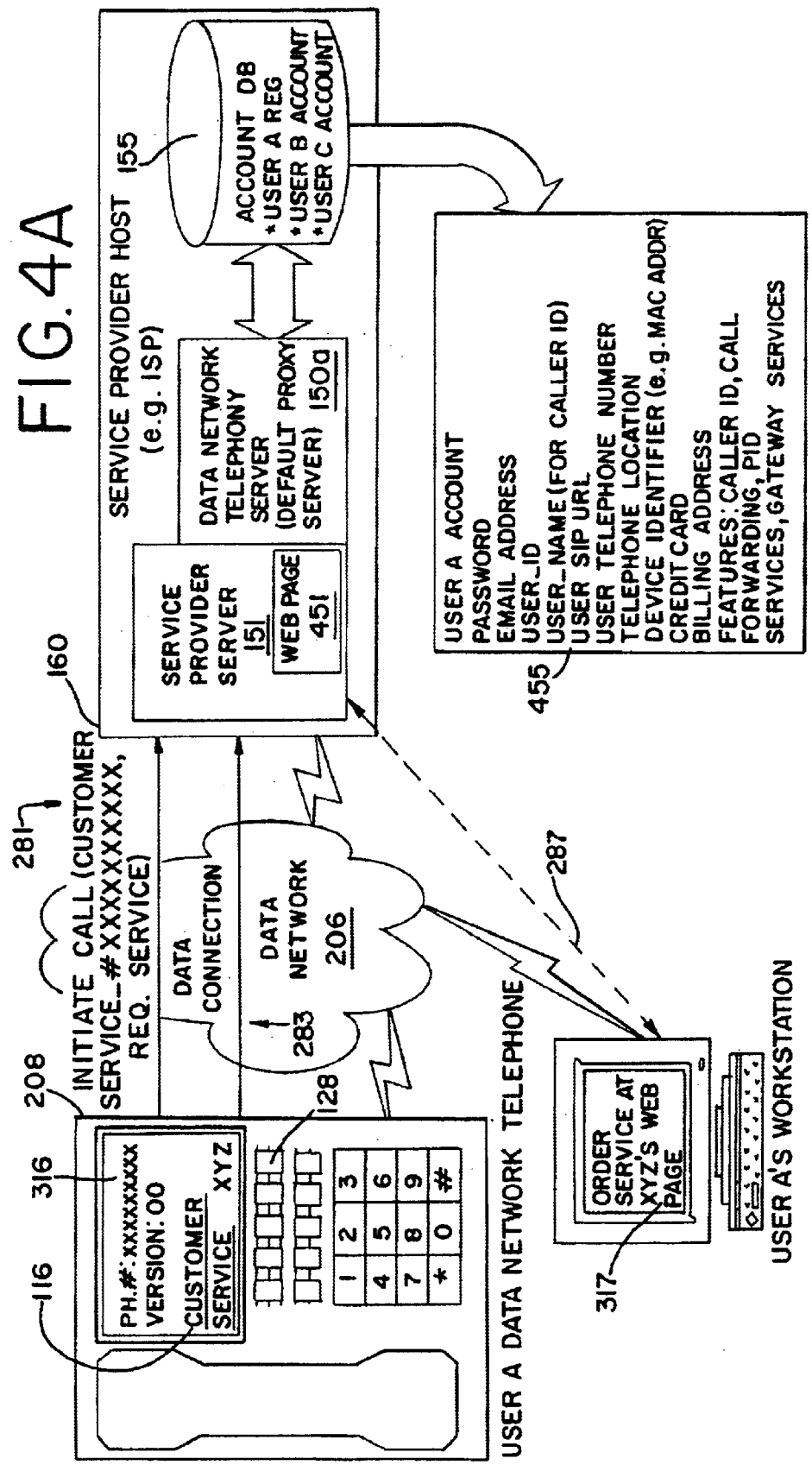

FIG. 4B

NEW ACCOUNT

WELCOME TO 3COM/(YAHOO!, AOL, MSN, AT&T, MCI, LEVEL3) INTERNET VOICE SERVICES. ALL 3COM/XXX INTERNET VOICE SERVICES MEMBERS CAN BE REACHED AT 1-800-555-3COM EXT. (PROVIDER NUMBER)(PERSONAL NUMBER)

YOUR PERSONAL NUMBER CAN BE ANY NUMBER YOU CHOOSE WHICH IS NOT ALREADY TAKEN.

CHOOSE YOUR PERSONAL NUMBER (VARIABLE LENGTH)

A PASSWORD:
RE-ENTER:
A SHORT NAME FOR CALLER ID:
YOUR E-MAIL ADDRESS:
THE PHONE DEVICE ID:
A SIP URL: (OPTIONAL)
A CREDIT CARD AND EXPIRATION DATE:

PHONE LOCATION:

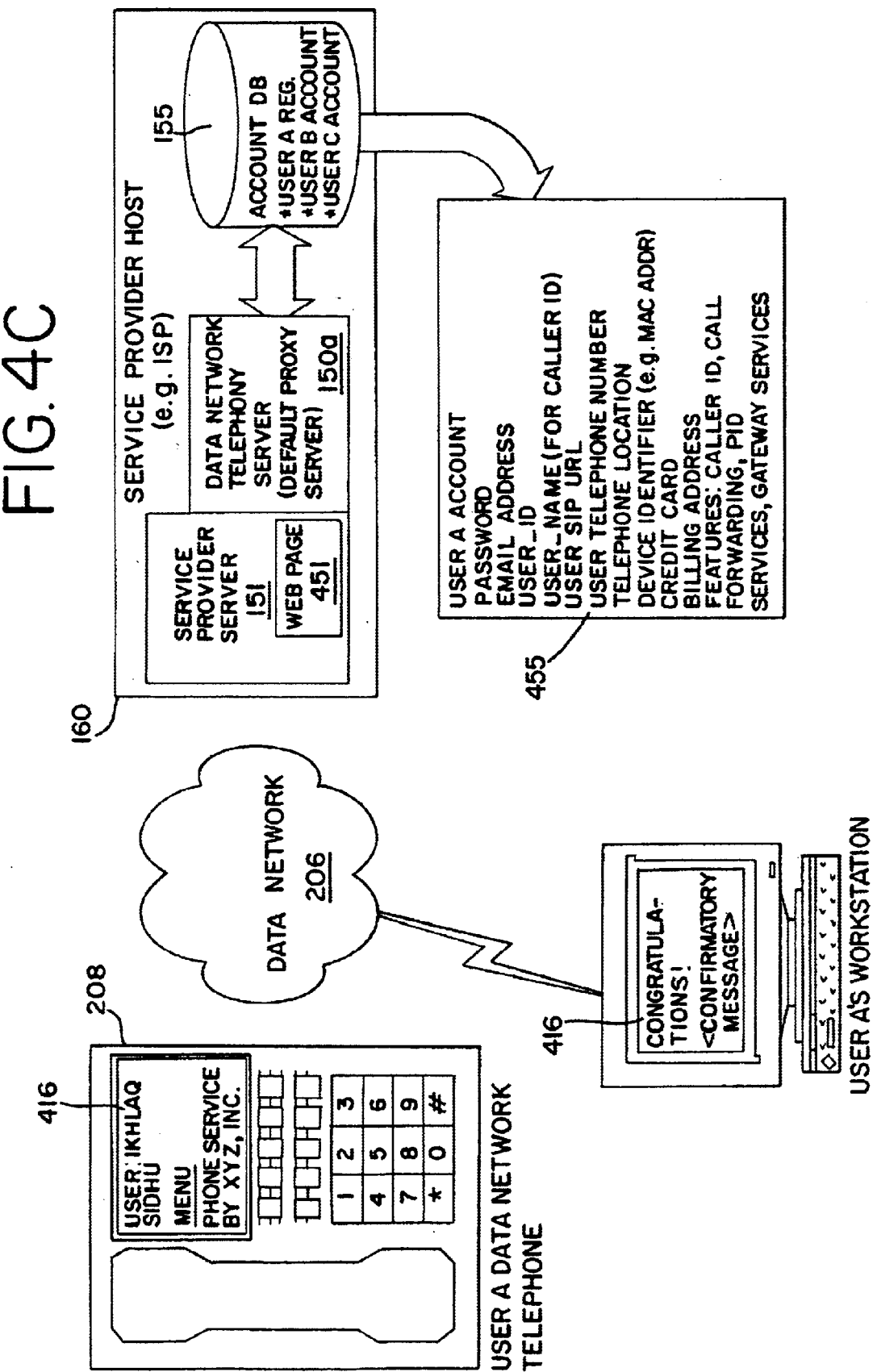

417

Congratulations!

An E-mail has been sent to you. You must reply to that e-mail to activate this account. You should print this page and keep it for future reference.

+ Your new "personal" phone number is 1-800-5553Com    Ext. 200 634-0610
+ Your SIP address (for Palm PDA based dialing) is ikhlaq_sidhu.3com.com@xxx.com Some Frequently asked questions:
Q: How do I dial another 3Com / XXX Internet phone user?
A: You only need to dial the extension number. For example other 3Com/(...) users with the same provider code (200) can call you at 634-0610. To call a user with another (say 202) provider number, you must dial 1-202-634-0610.

Q: How do I dial traditional people phones?
A: Dial 9 to get out of the system. I.e. dial 9, 1800-CALL ATT to use a AT&T calling card.

Q: How are calls billed?
A: There is no extra charge for calls to other 3Com/XXX subscribers.
There is no extra charge to make domestic long distance calls over the Public Telephone Net. International calls over the public network are billed to your credit card on a per call basis.

Q: How do I set speed dials and other advanced features?
A: Goto www.3comvoice.com/ikhlaq_sidhu.3com.com@xyz.com and enter your password ZZZ.

Q: How do I use speed dialing from my Palm PDA?
A: The proxy server option must be set to proxy@xxx.com. Any subscriber with an e-mail address can be auto dialed by. . . .

FIG. 4D

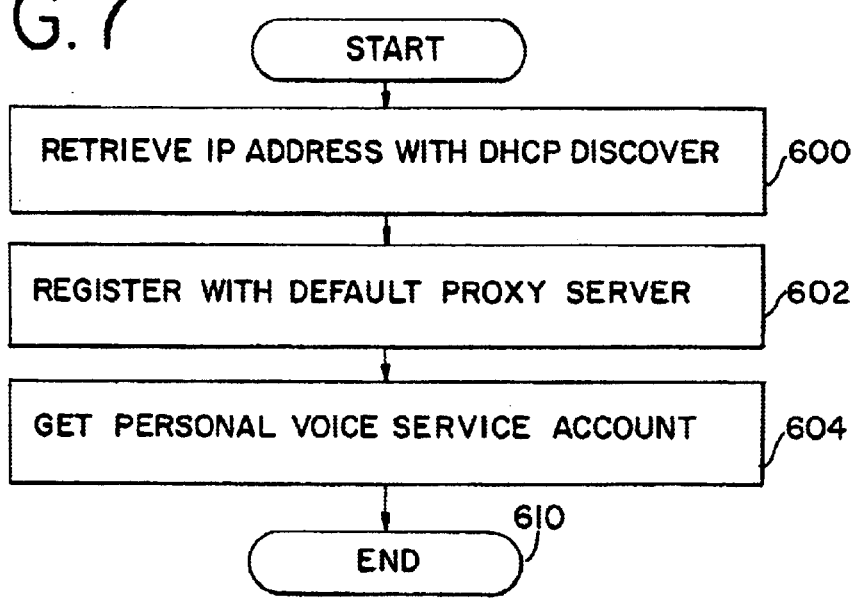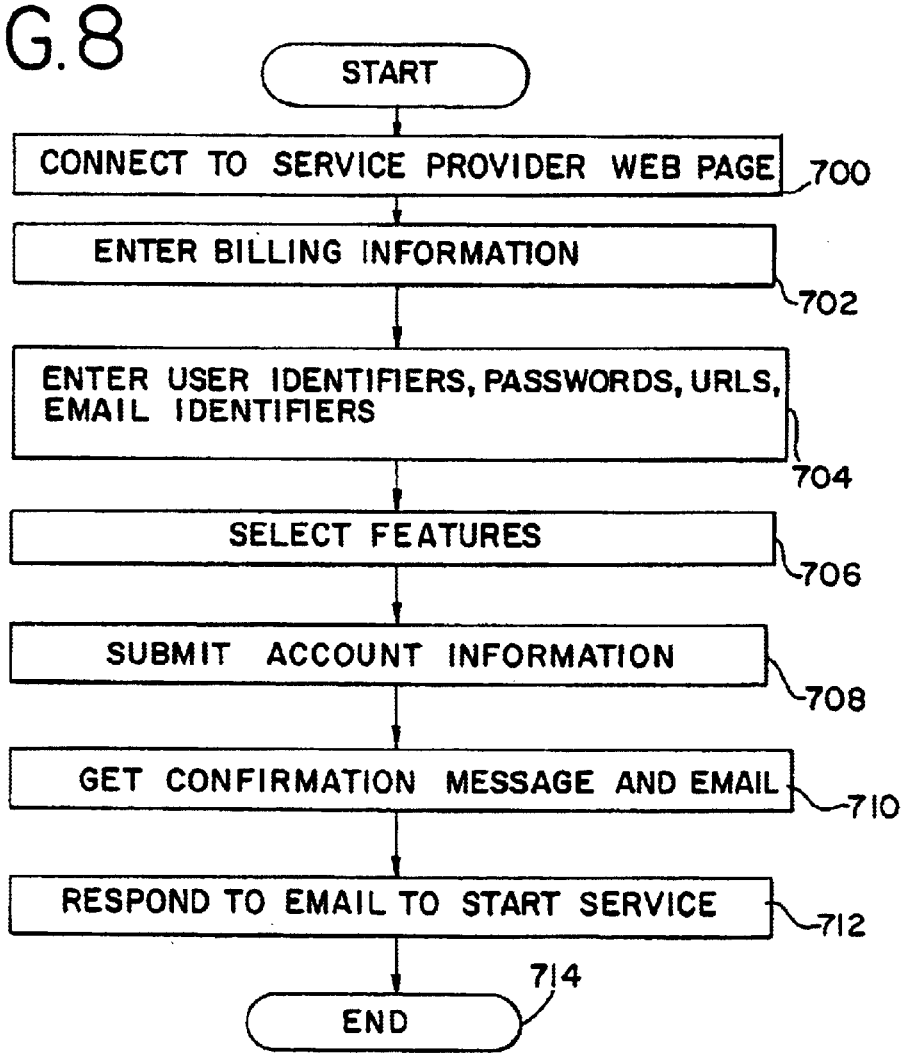

SYSTEM AND METHOD FOR PROVIDING USER-CONFIGURED TELEPHONE SERVICE IN A DATA NETWORK TELEPHONY SYSTEM

BACKGROUND OF THE INVENTION

A. Field of the Invention The present invention is related to the field of telecommunications, and more particularly to a system and method for enhancing the telephone service for providing local information during telephone connections in a data network telephone system. In circumstances, such as emergency situations, it may be important for one party to the telephone connection to have information regarding the geographical location of the caller without expecting to obtain the information from the caller.

B. Description of the Related Art and Advantages of the Present Invention

For many years, telephone service providers on the Public Switched Telephone Network (PSTN) provided their customers nothing more than a telephone line to use to communicate with other subscribers. Over time, telephone service providers have enhanced their service by providing Custom Local Area Signaling Service (CLASS) features to their customers. Similar communication services are provided by a Private Branch Exchange (PBX), which is typically implemented in a nonresidential setting.

The CLASS features permit customer subscribers of the features to tailor their telephone service according to individual needs. Some of the well-known CLASS features are:

Call blocking: The customer may specify one or more numbers from which he or she does not want to receive calls. A blocked caller will hear a rejection message, while the callee will not receive any indication of the call.

Call return: Returns a call to the most recent caller. If the most recent caller is busy, the returned call may be queued until it can be completed.

Call trace: Allows a customer to trigger a trace of the number of the most recent caller.

Caller ID: The caller's number is automatically displayed during the silence period after the first ring. This feature requires the customer's line to be equipped with a device to read and display the out-of-band signal containing the number.

Caller ID blocking: Allows a caller to block the display of their number in a callee's caller ID device.

Priority ringing: Allows a customer to specify a list of numbers for which, when the customer is called by one of the numbers, the customer will hear a distinctive ring.

Call forwarding: A customer may cause incoming calls to be automatically forwarded to another number for a period of time.

A customer subscriber to a CLASS feature may typically activate and/or de-activate a CLASS feature using "*" directives (e.g.,*69 to automatically return a call to the most recent caller). CLASS features may also be implemented with the use of out-of-band data. CLASS feature data is typically transmitted between local Class-5 switches using the Signaling System 7 (SS7).

Local Exchange Carriers (LECs) and other similar organizations maintain CLASS offices that typically contain a database entry for each customer. The database allows specification of the CLASS features a customer has subscribed to, as well as information, such as lists of phone numbers, associated with those features. In some cases, customers may edit these lists on-line via a touch-tone interface. A list of all phone numbers that have originated or terminated a call with each customer is often included in the CLASS office database. For each customer, usually only the most recent number on this list is stored by the local Class-5 switch.

A Private Branch Exchange (PBX), is a stored program switch similar to a Class-5 switch. It is usually used within a medium-to-large-sized business for employee telephony service. Since a PBX is typically operated by a single private organization, there exists a wide variety of PBX services and features. Custom configurations are common, such as integration with intercom and voice mail systems. PBX's typically support their own versions of the CLASS features, as well as other features in addition to those of CLASS. Most PBX features are designed to facilitate business and group communications.

A summary of typical PBX features includes:

Call transfer: An established call may be transferred from one number to another number on the same PBX.

Call forwarding: In addition to CLASS call forwarding, a PBX number can be programmed to automatically transfer a call to another number when the first number does not answer or is busy.

Camp-on queuing: Similar to PSTN call return, a call to a busy number can be queued until the callee can accept it. The caller can hang up their phone and the PBX will ring them when the callee answers.

Conference calling: Two or more parties can be connected to one another by dialing into a conference bridge number.

Call parking: An established call at one number can be put on hold and then reestablished from another number. This is useful when call transfer is not warranted.

Executive override: A privileged individual can break into an established call. After a warning tone to the two participants, the call becomes a three-way call.

While the CLASS and PBX features have enhanced the offerings of service providers that use the PSTN, the features are nevertheless limited in their flexibility and scope. The effect to the user is that the features become clumsy and difficult to use. For example, in order to use the Call Forwarding function, the user must perform the steps at the user's own phone prior to moving to the location of the telephone to which calls will be forwarded. A more desirable approach, from the standpoint of usefulness to the user, would be to perform the steps at the telephone to which calls will be forwarded.

Much of the lack of flexibility of the PSTN features is due to the lack of flexibility in the PSTN system itself. One problem with the PSTN is that the terminal devices (e.g. telephones) lack intelligence and operate as "dumb" terminals on a network having the intelligence in central offices. Most PSTN telephones are limited in functional capability to converting the analog signals they receive to sound and converting the sound from the handset to analog signals.

Some PSTN telephones have a display device and a display function to display specific information communicated from intelligent agents in the PSTN network using the PSTN signaling architecture. For example, some PSTN telephones have a display function to enable the Caller ID feature. Even such PSTN telephones are limited however by the closed PSTN signaling architecture, which prohibits access by the PSTN telephones to the network signaling protocols. The display functions are effectively limited to displaying text, again, as a "dumb" terminal.

The Internet presents a possible solution for distributing intelligence to telephony terminal devices. In Internet telephony, digitized voice is treated as data and transmitted across a digital data network between a telephone calls' participants. One form of Internet telephony uses a telephony gateway/terminal where fP telephony calls are terminated on the network. PSTN telephones are connected by a subscriber line to the gateway/terminal at the local exchange, or at the nearest central office. This form of Internet telephony provides substantial cost savings for users. Because the PSTN portion used in Internet telephony calls is limited to the local lines on each end of the call, long distance calls may be made for essentially the cost of a local call. Notwithstanding the costs savings provided by this form of Internet telephony, it is no more flexible than the PSTN with respect to providing enhancements and features to the basic telephone service.

In another form of Internet telephony, telephones are connected to access networks that access the Internet using a router. The telephones in this form of Internet telephony may be substantially more intelligent than typical PSTN telephones. For example, such a telephone may include substantially the computer resources of a typical personal computer.

Such telephones or, data network telephones use packet-switched data connections as opposed to the circuit-switched connections used in the traditional PSTN. One problem with a data network telephone system is that data routers establish the data network telephone connections without any knowledge of the locations of the telephones. PSTN switches, on the other hand, make PSTN connections between telephones in specific locations. PSTN telephones have numbers that the PSTN system can correspond to a location.

The PSTN system can make advantageous use of the location information corresponding to the PSTN telephone numbers in special circumstances. For example, the '911' emergency system uses location information corresponding to the telephone numbers that make calls to '911' control centers. Emergency help may be sent to a location learned from merely receiving the call, which is helpful in situations where the caller may not be physically able to communicate the location.

It would be desirable, in a data network telephone system, for a telephone to be able to communicate location information during the call setup to the callee's telephone.

The present invention addresses the above needs by providing a system in a data network telephony system, such as for example, the Internet, that provides a way for location information to be communicated to the destination telephone. The embodiments of the present invention may be used, for example, to implement an emergency telephone number and dispatch system in a data network telephone environment.

SUMMARY OF THE PRESENT INVENTION

In view of the above, one aspect of the present invention is directed to a system having at least one data network telephone connected to a data network operable to communicate on a plurality of data communications channels. The data network telephone communicates voice signals as data packets on a voice over data channel with a voice communication device. The data network telephone includes a memory having a telephone location identifier to identify the location of the data network telephone and a location information transmitter to send the telephone location identifier to the voice communication device. A service provider server is connected to the data network to establish a user interactive connection to obtain a telephone location from the user, and to configure the data network telephone with a configuration including the telephone location to store in the memory as the telephone location identifier.

In another aspect of the present invention, a voice communication device is provided having a network interface to connect to a data network to communicate on a plurality of data communications channels. The voice communication device communicates voice signals as data packets on a voice over data channel with a second voice communication device. A memory having a telephone location identifier is included to identify the location of the voice communication device and a location information transmitter operable sends the telephone location identifier to the second voice communication device. A registration function communicates with a service provider server connected to the data network to configure the voice communication device to obtain a telephone location and to configure the voice communication device with a configuration including the telephone location to store in the memory as the telephone location identifier.

In another aspect of the present invention, a service provider server is provided having a network interface for communicating over at least one data communications channel. An accounts database accesses a user account having a user telephone service account for using a data network telephone. A provisioning function provides a feature request form to a user on one of the data communications channels. The feature request form receives user input to select at least one feature enhancement and a telephone location. A service configuration function is included to send a message to the data network telephone to activate the service enhancements and to store the telephone location.

In another aspect of the present invention, a method is provided for transmitting location information of a data network telephone during a telephone connection. In accordance with the method, a voice over data communication channel connected to a second voice communication device is detected and a telephone location identifier is retrieved from a memory element in the data network telephone. The telephone location identifier is added to a data packet. The data packet is communicated to the second voice communication device.

In another aspect of the present invention, a method is provided for configuring a data network telephone for service. A request to configure the data network telephone is received from the user. A user feature request form prompts the user to select features and to enter an identifier identifying a physical location of the data network telephone. A user account is setup in accordance with the selected features. A configuration message is sent to the data network telephone. The configuration message includes a telephone location identifier to store in the data network telephone.

BRIEF DESCRIPTION OF THE DRAWINGS

Presently preferred embodiments of the invention are described below in conjunction with the appended drawing figures, wherein like reference numerals refer to like elements in the various figures, and wherein:

FIG. 1 is block diagram of a data network telephony system for providing telephony and enhanced telephony services in accordance with embodiments of the present invention;

FIG. 3A is a block diagram showing the interaction between components in accordance with one example of a system and method for configuring a data network telephone for service in the data network telephony system in FIG. 2A;

FIG. 3C is a block diagram showing one example of the interaction between components in ₁the embodiment shown in FIG. 4A when registration is complete;

FIG. 4A is a block diagram showing one example of the interaction between components in the embodiment shown in FIG. 4A to provision the data network telephone version with a voice account;

FIG. 4B is a depiction of a sample screen for ordering telephone service for the data network telephone of FIG. 5A;

FIG. 4C is a block diagram showing the interaction between components in the embodiment shown in FIG. 4A to confirm service;

FIG. 4D is a depiction of a sample screen for confirming telephone service for the data network telephone of FIG. 5A;

FIG. 7 is a flowchart showing an example of a method for provisioning a data network telephone in the data network telephony system of FIG. 1; and FIG. 8 is a flowchart showing an example of confirming the telephony service ordered using the method described in FIG. 7.

DETAILED DESCRIPTION OF THE PREFERRED EMBODIMENT

Figure 2A:
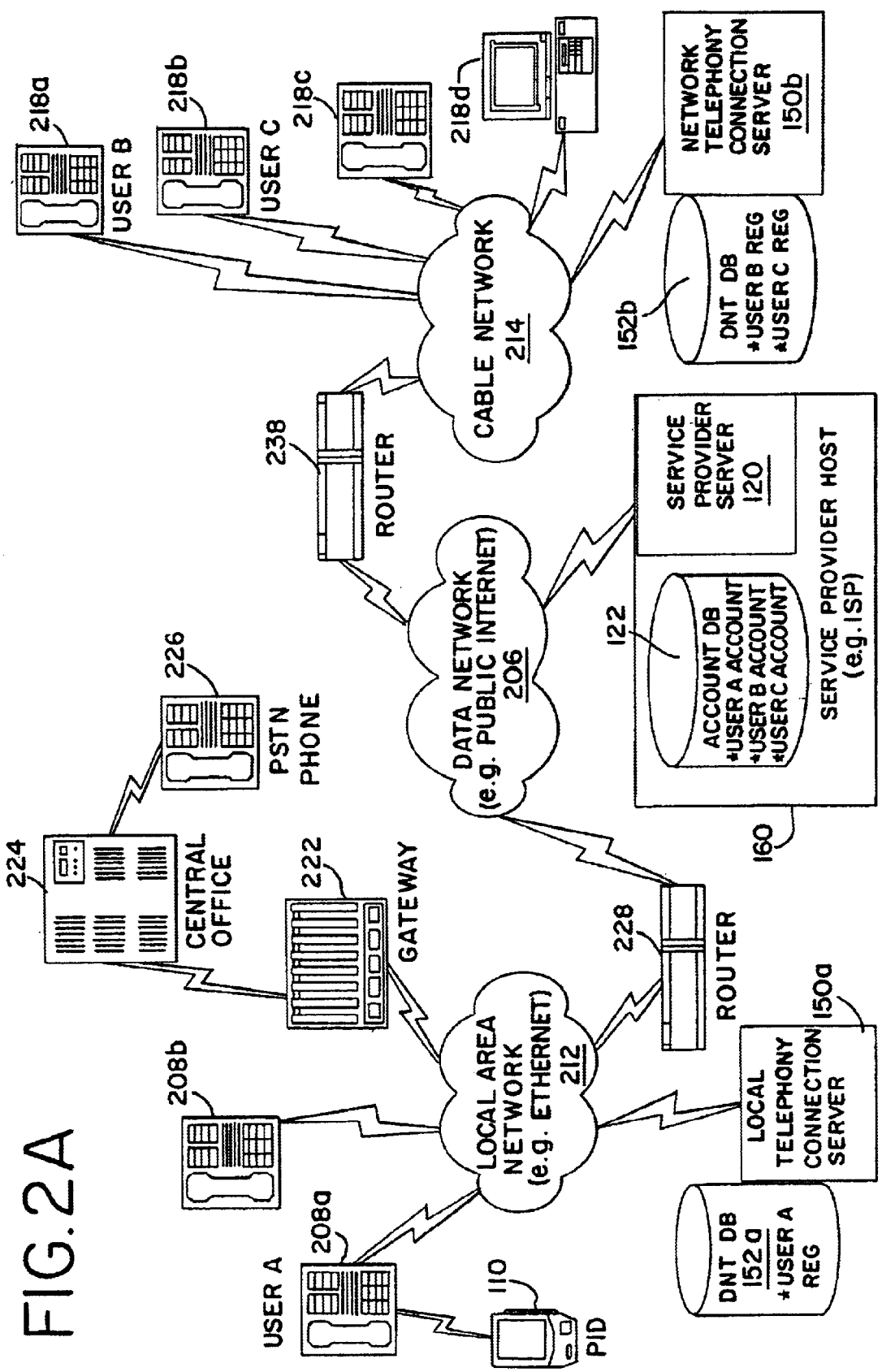
FIG. 2A shows one embodiment of the system of FIG. 1 showing examples of access to data network telephony service providers.

The following patent applications owned by the assignee of the present application are incorporated be reference:

U.S. patent application Ser. No. 09/406,321 "System and Method for Controlling Telephone Service Using a Wireless Personal Information Device" to Schuster, et al., U.S. patent application Ser. No. 09/406,320 "System and Method for Advertising Using Data Network Telephone Connections" to Schuster et al., U.S. patent application Ser. No. 09/405,283 "System and Method for Providing User-Configured Telephone Service in a Data Network Telephony System" to Sidhu, et al., U.S. patent application Ser. No. 09/406,322 "System and Method for Accessing a Network Server Using a Portable Information Device Through a Network Based Teleconimunication System" to Schuster, et al., U.S. patent application Ser. No. 09/406,152 "System and Method for Interconnecting Portable Information Devices Through a Network Based Telecommunication System" to Schuster, et al., U.S. patent application Ser. No. 09/405,981 "System and Method for Enabling Encryption on a Telephony Network" to Schuster, et al., U.S. patent application Ser. No. 09/406,128 "System and Method for Using a Portable Information Device to Establish a Conference Call on a Telephony Network" to Schuster, et al., U.S. patent application Ser. No. 09/406,151 "System and Method for Associating Notes with a Portable Information Device on a Network Telephony Call" to Schuster, et al., U.S. patent application Ser. No. 09/406,298 "System and Method for Providing Shared Workspace Services Over a Telephony Network" to Schuster, et al., U.S. patent application Ser. No. 09/406,066 "System and Method for Providing Service Provider Configurations for Telephones in a Data Network Telephony System" to Schuster, et al., U.S. patent application Ser. No. 09/451,388 "System and Method for Providing User Mobility Services on a Telephony Network" to Schuster, et al., U.S. patent application Ser. No. 09/470,879 "System and Method for Providing Call-Handling Services on a Telephony Network" to Schuster, et al., U.S. patent application Ser. No. 09/181,431 "Method Apparatus and Communication System for Companion Information and Network Appliances" to Wang, et al.;

U.S. patent application Ser. No. 09/321,941 "Multiple ISP Support for Data Over Cable Networks" to Ali Akgun, et al., U.S. patent application Ser. No. 09/218,793 "Method and System for Provisioning Network Addresses in a Data-Over-Cable System" to Ali Akgun, et al., U.S. patent application Ser. No. 08/887,313 "Network Access Methods, Including Direct Wireless to Internet Access" to Yingchun Xu, et al., The following patent applications owned by the assignee of the present application and filed concurrently with the application herewith, are incorporated by reference:

"System And Method For Providing Telephone Service Having Private Branch Exchange Features In A Data Network Telephony System" to Schuster et al., Ser. No. 09/515,365.

"System And Method For Providing A Wireless Data Network Telephone System" to Schuster et al., Ser. No. 09/515,798.

"System And Method For Accessing A Network Server Using A Portable Information Devices Through A Network Based Telecommunication System" to Schuster et al., Ser. No. 09/515,969.

"System And Method For Accessing Radio Programs Using A Data Network Telephone In A Network Based Telecommunication System" to Schuster et al., Ser. No. 09/516,269.

"System And Method For Providing Local Information In A Data Network Telephony System" to Schuster et al., Ser. No. 09/515,366.

"System And Method For Enabling A Portable Information Device For Use In A Data Network Telephone System " to Schuster et al., Ser. No. 09/515,795.

"Dialing Token For Initiating A Telephone Connection In A Data Network Telephone System" to Schuster et al., Ser. No. 09/515,364.

"Flexible Dial Plan for a Data Network Telephony System" to Schuster, et al., Ser. No. 09/515,797.

"Personalized Call Announcement on a Data Network Telephony System" to Schuster, et al., Ser. No. 09/515,387.

"Personalizing a Data Network Appliance on a Data Network Telephony System" to Schuster, et al., Ser. No. 09/515,970.

"Proximity-Based Registration on a Data Network Telephony System" to Schuster, et al., Ser. No. 09/515,796.

The following additional references are also incorporated by reference herein:

"Multiple ISP Support for Data Over Cable Networks" to Ali Akgun, et al.

U.S. patent application Ser. No. 09/218,793 "Method and System for Provisioning Network Addresses in a Data-Over-Cable System" to Ali Akgun, et al.,

A. Data Network Telephony System

FIG. 1 is a block diagram showing an example of a system 100 for providing telephony services according to preferred embodiments of the present invention. A first voice communication device 108a communicates by a voice connection over a data network 106 by establishing the connection via first access network 112. The voice connection may be linked to a second voice communication device 108b which is accessed via a second access network 114.

The data network 106 in the system 100 typically includes one or more Local Area Networks (LANs) connected to one another or to a Wide-Area Network (WAN), such as an Internet Protocol (IP) network, to provide wide-scale data connectivity. The data network 106 may use Voice Over Packet (VOP) schemes in which voice signals are carried in data packets. The network 106 may also include a connection to the Public Switched Telephone Network (PSTN) to allow for voice connections using traditional circuit switching techniques. In one embodiment, the data network 106 may include one or more LANs such as Ethernet LANs and support data transport protocols for performing Voice-over-Internet-Protocol (VOIP) techniques on the Internet. For further details regarding VoIP, see the information available through the Internet Engineering Task Force (IETF) at www.ietf.org. In addition, an Internet Telephony gateway may be included within the system 100 to allow for voice connections to users connected by subscriber lines at a PSTN Central Office.

The first and second voice communication devices 108a and 108b typically include a voice input, a voice output and a voice processing system (described further below with reference to FIG. 2B). The voice processing system converts voice sound from the voice input to digital data signals that are communicated on a voice connection over the data network. The voice processing system also converts digital data signals received from the voice connection to voice sound at the voice output. The voice communication devices 108a and 108b typically include a central processing unit and memory to store and process computer programs. Each voice communication device 108a and 108b typically includes a unique network address, such as an IP address, in memory to uniquely identify it to data network 106 and permit data packets to be routed to the device.

A first personal information device (PID) 110a may be connected to the first voice communication device 108a and may communicate over the data network 106 by connecting via the access network 112. The PID 110a may communicate with a second PID 110b connected to the second voice communications device 108b. Connections by the PIDs 110a,b may be made using the IrDA protocol or the Bluetooth system. Point to point links may include an RS232 port.

The PIDs 110a,b each contain user attributes stored in a user information database. The user attributes may contain such information as a user identifier, schedule information, and other information that is associated with a user of the PIDs 110a,b. The PIDs 110a,b each include a user interface allowing a user to easily enter and retrieve data. In a preferred embodiment, the user interface includes a pressure-sensitive display that allows a user to enter input with a sylus or other device. An example of a PID with such an interface is a PDA (Personal Digital Assistant), such as one of the Palm™ series of PDAs offered by 3Com Corporation. The PIDs 110a,b may include other functionality, such as wireless phone or two way radio functionality.

In one embodiment, the voice communication device 108a includes a handset with a receiver and transmitter similar or identical to handsets of traditional circuit-switched telephones. A console on which the handset sits may include the voice processing system, a display 116 and a keypad 118. The voice communication device 108a may also include a speed dial key set 128 programmed, or assigned to initiate connections to other voice communication devices that may be connected to the data network 106. In a preferred embodiment, the keys on the speed dial key set 128 may be programmed remotely by a message carried on a voice connection using a selected data transport protocol.

One example of the voice communication device 108a in a preferred embodiment is the NBX 100™ communication system phones offered by 3Com® Corporation, that has been modified, as described herein, to perform speed dial programming. In alternative embodiments, the voice communication device 108a may include any device having voice communications capabilities. For example, a personal computer having a microphone input and speaker output may also be used as the voice communication device 108a. Other configurations for the user interface are also intended to be within the scope of the present invention.

The voice communication devices 108a and 108b include components configured for operation with the data network 106 and the access networks 112, 114 connecting the voice communication devices 108a and 108b to each other and/or to other network entities. The access networks 112, 114 typically include any high bandwidth network adapted for data communications, i.e. a network having greater than 64,000 bits-per-second (bps) bandwidth. The access networks 112, 114 may link to the voice communication device 108a using an Ethernet LAN, a token ring LAN, a coaxial cable links (e.g. CATV adapted for digital communication), a digital subscriber line (DSL), twisted pair cable, fiberoptic cable, an integrated services digital network (ISDN) link, and wireless links. In embodiments that may not require a bandwidth greater than 64,000 bps, the access networks 112, 114 may also include the PSTN and link the voice communications device 108a by an analog modem. Further details regarding specific implementations are described below, with reference to FIGS. 2A and 2B.

B. System For Providing Provisioning and Configuration Services for a Telephone Using A Data Network Telephony System One advantage of the data network telephony system 100 in FIG. 1 is that a user may begin making telephone calls by connecting the data network telephone to the access network. Alternatively, another advantage of the system 100 is that the user may plug the data network telephone to the access network to receive rudimental service, but obtain access to fully personalized, user-configured service account as well as to user-selected telephony enhancements and features. Such features include the communication of information relating to the location of the voice communication device 108a,b to the other party to a telephone connection. The ability to communicate location information permits, as one example, the implementation of emergency dispatch services. One well-known example of such services is the '911' emergency service offered by telephony service providers.

Referring to the display 116 on the voice communication device 108a, a user of the first communication device 108a has dialed 9-1-1 using an example of a data network telephone system address ("SIP:911@isp.com" this format is discussed below). The 911 emergency center receives the telephone call at the second voice communication device 108b. In accordance with embodiments of the present invention, the location information of the first voice communication device 108a is received at the second communication device 108b without any action required on the part of the caller. The location information may be received as a voice signal in-band with the voice signals communicated on a voice over data communication channel used for conversation. The location information may also be communicated as data signals on a separate data communication channel permitting the information to be displayed on the display of the second voice communication device 108b, on a monitor (not shown), or as a text message that may be forwarded to other data communications devices (e.g. as email, text message page, etc.).

The location information communicated by the first voice communication device 108a may be stored in a memory element in the voice communication device 108a. In one embodiment of the present invention, the location information is stored in the memory element during the configuration of the voice communication device 108a for service. Other ways include using a terminal connection to the voice communication device 108a, or a network-based process in which an administrative system communicates the local information via connections on the first access network 112.

In a preferred embodiment, the voice communication device 108a receives account information, such as location information, and provisioning of services during the configuration of the voice communication device 108a and a corresponding service account.

A service provider server 120, connected to the data network 106, maintains user service accounts and manages the transport of data communications channels between voice communications devices 108a, 108b. A service provider database 122 stores the user accounts and other subscription information. In accordance with preferred embodiments, the service provider server 120 provides voice communications devices 108a, 108b with rudimentary service sufficient to connect to a service provider. The service provider server 120 then sets up user interactive connections to allow a user to configure a telephony user account. The user account is then activated substantially contemporaneously with the user interactive connection once the user submits the information, such as the location of the voice communication device 108a. By substantially contemporaneously, it is meant that no substantial waiting period is needed before the user account may be used. In alternative embodiments, the service provider server 120 configures voice communications devices 108a, 108b with a full, ready-to-use configuration. The service provider host 120 also makes modifications to the user accounts easy and immediate in effect. A user may select features for temporary use. For example, a user may set up call forwarding to use while at a meeting for a week, and then disable it for other times.

1. Local Area Network As An Exemplary Access Network

FIG. 2A is a block diagram showing one example of the system 100 of FIG. 1 for providing customized communication services according to the present invention. The system 200 in FIG. 2A includes a local area network 212, connected to a data network 206 by a first router 228 and a cable network 214 connected to the data network 206 by a second router 238. Those of ordinary skill in the art will appreciate that, while the local area network 212 and the cable network 214 are shown in FIG. 2A as access networks, any other type of network may be used. For example, the local area network 212 and/or the cable network 214 may be replaced by ISDN, DSL, or any other high-speed data link.

The local area network 212 provides data connectivity to its members, such as a first data network telephone 208a, a second data network telephone 208b, a gateway 222 and a network telephony connection server 150a. The local area network 212 in FIG. 2A is an Ethernet LAN operating according to the IEEE 802.3 specification, which is incorporated by reference herein, however, any other type of local area network may be used. The local area network 212 uses the router 228 to provide the data network telephone 208a,b, the gateway 222 and the network telephony connection server 150a with access to the data network 206. For example, the router 228 may perform routing functions using protocol stacks that include the Internet Protocol and other protocols for communicating on the Internet.

The network telephony connection server 150a (hereinafter"telephony connection server") provides telephony registration, location and call initiation services for voice connections in which its members are a party. A user may register for telephony service with an administrator of the telephony connection server 150a and receive a user identifier and a telephone identifier. The user identifier and telephone identifier may be sequences of unique alphanumeric elements that callers use to direct voice connections to the user. The telephony connection server 150a registers users by storing user records in a data network telephony user database (hereinafter"user database") 152a in response to registration requests made by the user.

The call setup process and the user and telephone identifiers preferably conform to requirements defined in a call management protocol. The call management is used to permit a caller anywhere on the data network to connect to the user identified by the user identifier in a data network telephone call. A data network telephone call includes a call setup process and a voice exchange process. The call setup process includes steps and message exchanges that a caller and callee perform to establish the telephone call. The actual exchange of voice signals is performed by a data communications channel. The data communications channel incorporates other data transport and data formatting protocols, and preferably includes well-known data communications channels typically established over the Internet.

The call management protocol used in FIG. 2A is the Session Initiation Protocol (SIP), which is described in M. Handley et al., "SIP: Session Initiation Protocol," IETF RFC 2543, March. 1999, incorporated by reference herein, however, any other such protocol may be used. Other protocols include H.323, the Media Gateway Control Protocol (MGCP), etc.

The local area network 206 is connected to a gateway 222. The gateway 322 communicates with a PSTN central office 224, which provides PSTN service to a PSTN phone 226. The PSTN phone 226 is likely to be one of many PSTN phones serviced by the central office 224. Additional portions of a PSTN network have been omitted from FIG. 2A to improve clarity. The PSTN network is well known by those having skill in the art of telecommunications.

The telephony connection server 150*a* provides telephony service for mobile users. A user may be registered to use the first network telephone 208*a* (which is identified by its telephone identifier), but move to a location near the second data network telephone 208*b*. The user may re-register as the user of the second data network telephone 208*b*. Calls that identify the user by the user's user identifier may reach the user at the second network telephone 208*b*.

2. The Data Network Telephones

The data network telephones 208*a,b* are Ethernet phones which are telephones that include an Ethernet communications interface for connection to an Ethernet port. The Ethernet phones in FIG. 2A support the Internet Protocol (IP), using an IP address that is either statically configured or obtained by access to a Dynamic Host Configuration Protocol (DHCP) server.

Figure 2B:
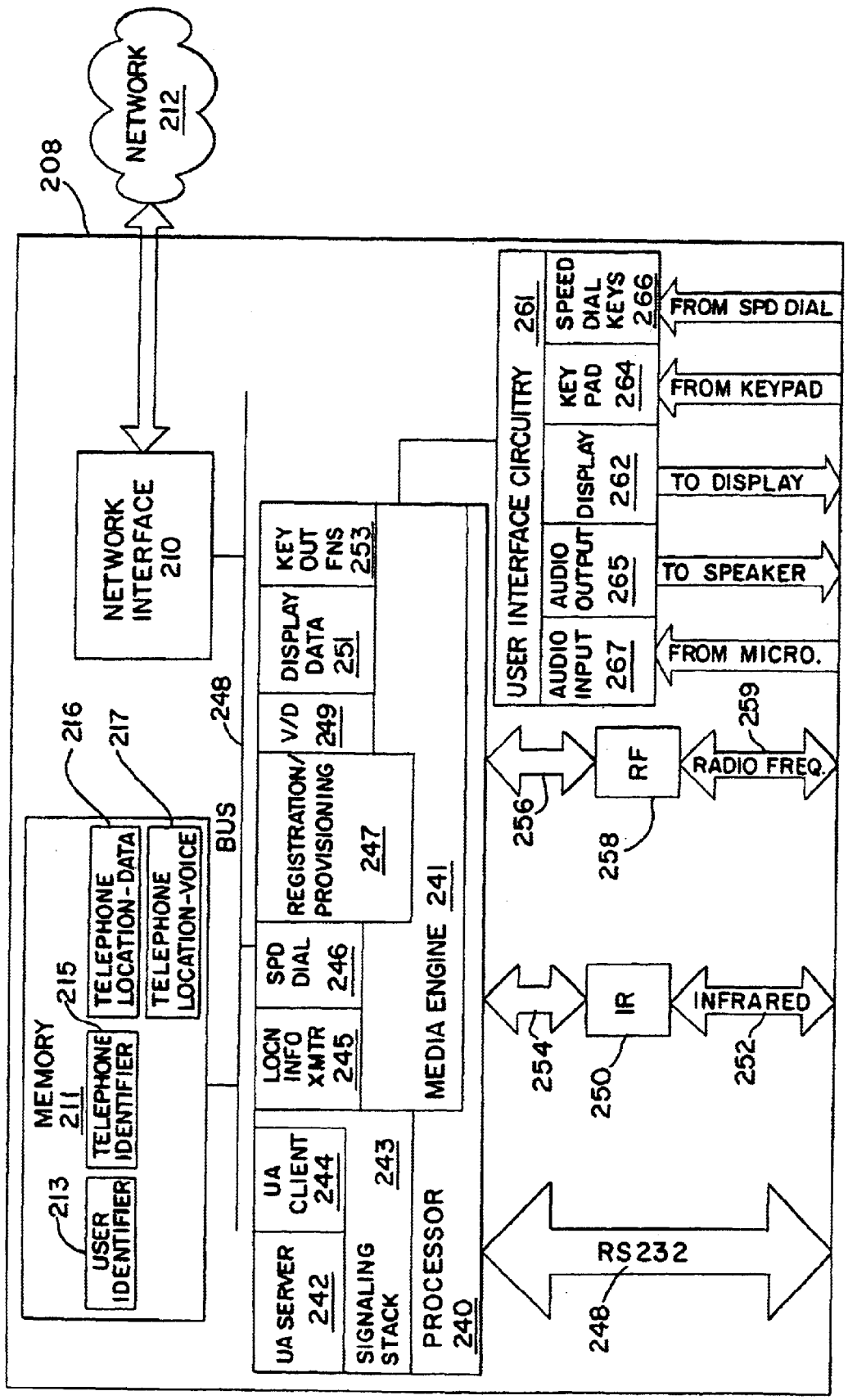
FIG. 2B. shows one example of one of the data network telephones in FIG. 2A.

FIG. 2B is a block diagram showing the data network telephone 208*a* connected to the local area network 212 in FIG. 2A. The data network telephone 208 in FIG. 2B is connected to the network 212 by a network interface 210. The network interface 210 may, for example, be a network interface card, and may be in the form of an integrated circuit. A bus 248 may be used to connect the network interface 210 with a processor 240 and a memory 242. Also connected to the processor are user interface circuitry 261 and three alternative (and all optional) interfaces to the Personal Information Device (PID) 110 (shown in FIG. 1).

A first interface 248 includes an RS-232 serial connection and associated coupling hardware and mechanisms. The first alternative interface 248 may, for example, be a docking cradle for a PDA, in which information can be transferred between the PDA and the data network telephone 208. The second alternative interface comprises a first connection 254, such as an RS-232 connection, along with infrared circuitry 250 for converting signals into infrared output and for accepting infrared input. An infrared interface 252 may also be included within the second alternative interface. The third alternative interface comprises a first connection 256, such as an RS-232 connection, along with radio-frequency circuitry 258 for converting signals into radio frequency output and for accepting radio frequency input. A radio frequency interface 259 may also be included as part of the third alternative interface.

The three alternative interfaces described above are merely examples, and additional means for implementing the interface between the data network telephone 208 and the PID may also be used. Although three interfaces are shown in FIG. 2B, there may be only one such interface in the data network telephone 208. More than one interface may be included to improve flexibility and to provide redundancy in case of failure of an interface.

The user interface circuitry 261 includes hardware and software components that access the functions of the handset, display, keypad and speed dial keypad to provide user input and output resources for functions in the processor 240. The user interface circuitry includes a display interface 262, a keypad interface 264, a speed dial interface 266, an audio output interface 265 and an audio input interface 267.

The audio input interface 267 may receive voice signals from a microphone or other audio input device and converts the signals to digital information. The conversion preferably conforms to the G.711 ITU Standard. Further processing of the digital signal may be performed in the audio input interface 267, such as to provide compression (e.g. using G.723.1 standard) or to provide noise reduction, although such processing may also be performed in the processor 240. Alternatively, the audio input interface 267 may communicate an analog voice signal to the processor 240 for conversion to digital information.

The audio output interface 265 receives digital information representing voice from the processor 240 and converts the information to sound. In one embodiment, the speaker interface receives information in the form of G.711 although other processing such as decompression may be performed in the speaker interface 265. Alternatively, the processor 240 may convert digital information to analog voice signals and communicate the analog voice signals to the speaker interface 265.

The speed dial interface 266, the keypad interface 264 and the display interface 262 include well-known device interfaces and respective signal processing techniques. The speed dial interface 266 may include an interface to buttons on a keypad, or to display buttons that the user activates by pressing designated areas on the screen.

The user interface circuitry 261 may support other hardware and software interfaces. For example, a videophone implementation might also include a camera and monitor. The fixed communication device of the present invention is not limited to telephones or videophones—additional user interface types, for example, such as the ones needed for computer games, are also contemplated as being within the scope of the present invention.

The processor 240 may consist of one or more smaller processing units, including, for example, a programmable digital signal processing engine. In the preferred embodiment, the processor is implemented as a single ASIC (Application Specific Integrated Circuit) to improve speed and to economize space. The processor 240 also includes operating system, application and communications software to perform the functions of the data network telephone 208. The operating system may be any suitable commercially available embedded or disk-based operating system, or any proprietary operating system.

The processor 240 includes a media engine 241 and a signaling stack 243 to perform the primary communications and applications functions of the data network telephone 208. The purpose of the signaling stack in an exemplary data network telephone 208 is to set up, manage, and tear down a call. During the setup phase, a user may use the keypad to enter a user identifier to call. The signaling stack 243 receives the user entry and formats a request message to send to the user identified by the user identifier to initiate a telephone call. The request message is sent to discover the location of the user identified by the user identifier, exchange communication parameters, such as the supported voice CODEC types, and establish the voice channel.

During the management phase, communication proceeds over the voice over data channel. Other parties may be invited to the call if needed or the existing CODEC can be changed. During the teardown phase, the call is terminated.

The signaling protocol used in the data network telephone 208 in FIG. 2B is the SIP protocol. In particular, the signaling stack implements a User Agent Client 244 and a User Agent Server 242, in accordance with the SIP protocol. Alternative signaling protocols, such as the ITU-T H.323 protocol and others, may also be used to implement the present invention.

Once the call is setup, the media engine 241 manages the communication over a data communications channel using a network transport protocol and the network interface 210. The media engine 241 sends and receives data packets having a data payload for carrying data and an indication of the type of data is being transported. The media engine 241 in the data network telephones 208 may sample the voice signals from the audio input 267 (or receive voice samples from the audio input 267), encode the samples, and build data packets on the sending side. On the receiver side, in addition to performing the reverse operations, the media engine also typically manages a receiver buffer to compensate for network jitter.

The media engine 241 includes hardware and software components for performing location information transmission 245, speed dial functions 246, registration functions 147, voice-over-data functions 249, display data function 251 and keypad output functions 253. The media engine 241 processes data that is received from the network 212, and data that is to be sent over the network 241.

For data that is received from the network 212, the media engine 241 may determine from the type of data in the packet whether packets contain sampled voice signals or data for performing other functions. Packets containing sampled voice signals are processed by voice over data function 249. The voice over data function 249 preferably conforms to a protocol for formatting voice signals as digital data streams. While any suitable protocol may be used, the media (voice signal) is preferably transported via the Real Time Protocol (RTP), which itself is carried inside of User Datagram Protocol (UDP). RTP is described in H. Schulzrinne et al.,"RTP: A Transport Protocol for Real-Time Applications," IETF RFC 1889, January 1996, which is incorporated herein by reference. UDP is described in J. Postel,"User Datagram Protocol," IETF RFC 768, August 1980, and IP is described in J. Postel, ed.,"Internet Protocol," IETF RFC 791, September 1981, both of which are incorporated by reference herein.

Packets containing data for use in registering the data network telephone 208 with a network telephony service are processed by the registration/provisioning function 247. By registering the data network telephone 208, a user may establish with the network telephony service provider that calls addressed to the user's user identifier may be connected to the data network telephone 208. Provisioning configures the data network telephone 208 with features and other user account information that relate to the service provider.

Registration may occur when the data network telephone 208 sends a request to register to a service provider host, which may occur during power up, if the data network telephone 208 is connected to the network 212, or when the user connects the data network telephone 208 to the network 212. The registration/provisioning function 247 may automatically send the Register request when the network is sensed. The service provider host may respond by setting the user's user identifier to correspond to the telephone identifier of the data network telephone 208, and by acknowledging the request with a status message to the data network telephone 208. In one embodiment, the service provider host communicates a response message to the data network telephone that includes a service provider logo and/or a configuration program that programs selected features into the telephone. The selected features may include a speed dial assignment to a customer server, a help menu, a user-friendly display, etc.

Other features may be added to the registration/provisioning functions 247, or implemented as extensions to the registration functions 247. For example, the data network telephone 208 may be provisioned to provide selected network telephony features by establishing a data connection with a service provider, requesting the selected services, and receiving data that ensures that the services have been successfully provisioned. Such features may include, for example, caller identification, call forwarding, voice mail, unified voice/email, gateway services, PID-based applications, call conferencing, advertisement enable/disable, and any other service offered by the network telephony service provider to enhance the capabilities of the data network telephone 208.

The requests for features may be made contemporaneously with setting up a new account (as described below with reference to FIGS. 3A–8). The features may also be requested to modify the service. Users need not be locked into any service plan or feature set. One advantage of such provisioning functions is that services may be ordered for temporary use in a manner that is convenient to the user.

The registration and/or provisioning of the data network telephone 208 for service may occur during a user interactive session during which the user provides the service provider with information related to the user's account. During the interactive session, the user may provide the service provider with the location of the telephone. The service provider may then send a telephone location identifier 216, 217 to the data network telephone 208 for storage in the memory 211 along with the user identifier 213 and the telephone identifier 215.

The user preferably uses the postal address of the location of the telephone as the data for the location information. However, the information used may be enhanced by using floor information, room information, etc. In addition, other forms of identifying a location may also be used, such as, longitude/lattitude coordinates, directions, building function, names of residents or company, etc. The user may also enter the postal address and the service provider may send back the location for storage in any suitable alternative form.

The telephone location identifier is preferably stored as the telephone location identifier data 216 and the telephone location identifier voice 217. The telephone location identifier data 216 may be communicated by the location information transmitter 245 on a data communication channel out of band with the voice signal in the voice over data communication channel used for conversation. Any suitable data format (e.g. text or ASCII) may be used to store the telephone location identifier data 216. The telephone location identifier voice 217 may be communicated in-band with the voice signals communicated on the voice over data communication channel used for conversation. The telephone location identifier voice 217 is preferably stored as one or more string of G.711-based data elements. The telephone location identifier voice 217 may be generated by the service provider using speech synthesis techniques, or a function may be provided to permit the user to record the location information. In a preferred embodiment, both voice and signal identifiers 216, 217 are stored.

The location information transmitter 245 sends the telephone location identifier 216, 217 to the callee during a telephone connection. Alternatively, the location information transmitter 245 may send the telephone location identifier 216, 217 during the call setup using the SIP message interaction (e.g. SIP Reply). The location information transmitter 245 may send either the telephone location identifier data 216 or voice 217 or both when the media engine 241 senses that the user has dialed an emergency dispatch center (e.g. 911). The location information transmitter 245 may also send the telephone location identifier data 216 for all call initiations.

Packets containing data that is to be displayed on the display device are processed by the display data function 251. The display data function 251 may be used for displaying, for example, the name(s) and user identifier(s) of the other party(-ies) to the call, the status of the telephone call, billing information, and other information. The display data function 251 may also provide access to the display interface 262 for the display of commercial messages sent from the commercial message server 120 (shown in FIG. 2A). The display data function 251 may process image data and text data that may be contained in and of the messages.

Packets containing data that programs or assigns speed dial keys are processed by the speed dial function 246. A speed dial key may be programmed during registration with the user identifier of the service provider's customer service department, or to a provisioning service. When a message, or one or more packets, is received, the data in the commercial message is examined for speed dial programming data. The speed dial programming data may include a speed dial key selector to identify the speed dial key being programmed, and a user identifier used to initiate a telephone call when the selected speed dial key is pressed. The speed dial programming data may also include directions to be displayed on the display screen that inform the user that a selected speed dial key has been programmed. In addition, the speed dial programming data may include an icon for display on a touch sensitive screen that describes the user or service to be reached when the icon on the display is touched.

The speed dial programming data may also include an indication of whether the speed dial key is to be programmed permanently, or temporarily. Temporarily programmed keys may be programmed for the duration of the present call only, or for a selected time period. Permanently programmed speed dial keys are programmed until re-programmed later.

For data that is to be sent over the data network 212, the media engine 241 formats the data as data packets in accordance with a selected protocol. The selected protocol is preferably the protocol that is supported by the data network telephone that will receive the data for the particular type of data being transported.

The voice over data function 249 formats voice samples according to the protocol used by the receiving data network telephone. In one preferred embodiment, the voice over data function 249 formats voice samples as RTP packets. The registration function 247 and the keypad output function 253 may use RTP or other protocols to transport data that does not represent voice signals.

3. Cable Network As An Exemplary Access Network

Referring back to FIG. 2A, the system 200 includes a cable network 214 connected to the data network 206 by a router 238. The cable network 214 provides data network access to its members, which in FIG. 2A include a third data network telephone 218a, a fourth data network telephone 218b, a fifth data network telephone 218c, a workstation 218d, a second data network connection telephony server 150b and a network telephony connection database 152b. The users of the data network telephones 218a–c connected to the cable network 214 may communicate by telephone over the data network 206 with the users of the data network telephones 208a,b connected to the local area network 214.

The cable network 214 includes any digital cable television system that provides data connectivity. In the cable network 214, data is communicated by radio frequency in a high-frequency coaxial cable. The cable network 214 may include a head-end, or a central termination system that permits management of the cable connections to the users.

The cable network 214 includes high-frequency coaxial cable connections for terminating the members, such as the data network telephones 218a–c and the workstation 218d. The third, fourth and fifth data network telephones 218a–c are preferably similar to the data network telephone 208 described with reference to FIG. 2B. One difference is that the third, fourth and fifth data network telephones 218a–c access telephone service over the cable network 214, and the first and second data network telephones 208a,b access telephone service over the Ethernet.

C. Providing Telephone Services By A Data Network Telephony Service Provider

1. Telephony Service Provider

FIG. 2A shows a service provider host 160 having a service provider server 120 and a service provider database 122. The service provider server 120 registers data network telephones and performs user interactive connections with users to configure users' telephone accounts. The host 160 is connected to the data network 206, however, the host 160 may also be connected to either access network 212, 214. The host 160 may also include network telephony connection servers, such as server 150a,b. The host 160 may also communicate with separately located local network telephony connection servers 150, 152 for billing purposes, or for carrying out the features selected by users. The host 160 may be managed by a telephony service provider or by any entity for a telephony service provider.

The telephony connection server 150b is preferably a SIP-based server that performs call initiation, maintenance and teardown for the data network telephones 218a–c connected to the cable network 214. The telephony connection server 150a connected to the local area similar or identical to the telephony connection server 150a connected to the local area network 212. The ISP host 160 includes the service provider server 120 and the service provider database 122.

The system 200 shown in FIG. 2A includes a data network telephony system that permits the data network telephones 208a,b connected to the local area network 212 to communicate with the data network telephones 214 connected to the cable network 214. The system shown in FIG. 2A uses SIP in order to establish, maintain and teardown sessions, or telephone calls between users.

There are two major architectural elements to SIP: the user agent (UA) and the network server. The UA resides at the SIP end stations, (e.g. the data network telephones), and contains two parts: a user agent client (UAC), which is responsible for issuing SIP requests, and a user agent server (UAS), which responds to such requests. There are three different network server types: a redirect server, a proxy server, and a registrar. The various network server types may be combined into a single server, such as the telephony connection server 150a,b. Not all server types are required to implement the embodiments of the present invention. The communication services to be provided will determine which servers are present in the communication system. Preferred embodiments of the present invention may be carried out using proxy servers.

One example of a SIP operation involves a SIP UAC issuing a request, a SIP proxy server acting as end-user location discovery agent, and a SIP UAS accepting the call. A successful SIP invitation consists of two requests: INVITE followed by ACK. The INVITE message contains a user identifier to identify the callee, a caller user identifier to identify the caller, and a session description that informs the called party what type of media the caller can accept and where it wishes the media data to be sent. User identifiers in SIP requests are known as SIP addresses. SIP addresses are referred to as SIP Uniform Resource Locators (SIP-URLs), which are of the form sip:user@host.domain. Other addressing conventions may also be used.

Redirect servers process an INVITE message by sending back the SIP-URL where the callee is reachable. Proxy servers perform application layer routing of the SIP requests and responses. A proxy server can either be stateful or stateless. A stateful proxy holds information about the call during the entire time the call is up, while a stateless proxy processes a message without saving information contained in the message. Furthermore, proxies can either be forking or non-forking. A forking proxy can, for example, ring several phones at once until somebody takes the call. Registrar servers are used to record the SIP address (called a SIP URL) and the associated IP address. The most common use of a registrar server is for the UAC to notify the registrar where the UAC can be reached for a specified amount of time. When an INVITE request arrives for the SIP URL used in a REGISTER message, the proxy or redirect server forwards the request correctly.

At the local area network 212, the central registrar/proxy server, such as the network telephony server 150a is the primary destination of all SIP messages trying to establish a connection with users on the local area network 212. Preferably, the network telephony server 150a is also the only destination advertised to the SIP clients outside the LAN 212 on behalf of all the SIP clients residing on the LAN 212. The network telephony server 150a relays all SIP INVITE messages to the appropriate final destination (or another SIP proxy), based on a database lookup using the user database 152a. It allows all mobile clients to register with their current locations.

Similarly, the network telephony server 150b is the primary destination of all SIP messages trying to establish a connection with the data network telephones 218a–c connected to the cable network 214. Preferably, the network telephony server 150b is also the only destination advertised to the SIP clients outside the LAN 212 on behalf of all the SIP clients (e.g. data network telephones) residing on the LAN 212. The network telephony server 150b relays all SIP INVITE messages to the appropriate final destination (or another SIP proxy), based on a database lookup using the user database 152b.

2. Registration of the Telephone

The data network telephones 208a,b and 218a–c in the system 200 preferably have pre-programmed device identifiers (e.g. MAC addresses or phone numbers), represented as SIP-URL's that are of the form sip:8475551212@3com.com. After power-up, each data network telephones 208a,b and 218a–c sends a SIP REGISTER message to the default registrar, such as the network telephony servers 150a,b. When a call arrives at one of the network telephony servers 150a,b for any of the registered SIP URLs, the server will forward the call to the appropriate destination. If a data network telephone is moved to a new location, all calls to the associated SIP URL will still be properly routed to that device. In other words, the system in FIG. 2A provides device mobility in the sense that calls will"follow" the data network telephone according to its SIP URL. This is especially useful if the data network telephone 208a,b or 218a–c is running the DHCP (Dynamic Host Configuration Protocol) so that when the location is changed, the IP address is also automatically changed.

An advantage of the system in FIG. 2A is that the network telephony connection server 150a,b may respond to REGISTER messages (for SIP and similar messages in other protocols) with a message that configures the data network telephone 208a,b or 218a–c to have a variety of ready-to-use features. The service provider may configure the telephony connection server 150a,b to enforce a particular configuration for operation, or offer the user choices of features that comprise the configuration. A data network telephone may be configured to include features such as:

TABLE A

User identifier: a sequence of alphanumeric elements that uniquely identifies the user. The user identifier may be formatted as an E.164 telephone number, or as a name. The user identifier may be unique throughout the universe of users on the data network telephony system 200 (shown in FIG. 1), or it may acquire such uniqueness by association with a server identifier.

Telephone Identifier: a sequence of alphanumeric elements that uniquely identifies the telephone. The telephone identifier may be formatted as an E.164 telephone number, or as a number, such as a MAC address. The telephone identifier may be unique throughout the universe of data network telephones on the data network telephony system 200, or it may acquire such uniqueness by association with a server identifier.

Telephone location identifier: a sequence of alphanumeric elements if stored as data, or of voice signals (e.g. G.711 signals) if stored as voice that identify the physical location of the data network telephone.

The user's name, address and other information that may be used primarily for billing purposes. For example, the user's checking account number, credit card number or other financial information may be provided for automatic billing and payment capabilities.

User's telephony service features. The user may subscribe, permanently or temporarily, to one or more telephony service features offered by the service provider:
    Voice mail
    Caller ID
    Call Forwarding with true number portability
    Teleconferencing
    Commercial messaging-a service that may be made available in embodiments of the present invention. A user may subscribe to have the data network telephone 218 receive (or not to receive) advertisements for display on the display of the data network telephone 218.
    Commercial messaging with speed dial programming-a service that may be made available in embodiments of the present invention. A user may subscribe to have the data network telephone 218 receive (or not to receive) advertisements that program the speed dial keys of the data network telephone 218. The display of the service provider logo
    Menu of functions
    Help menu
    Speed dial key programming (e.g. speed dial to customer service)
    Features as standard offerings-to compete, a provider may offer features that normally cost extra (e.g. caller ID, etc.) as standard features
    Packaged configurations-Features and offerings may be grouped as distinctly priced packages
    Functions using PDA connectivity (e.g. Remote Whiteboard communication, control of telephone use through PDA)

Figure 3B:
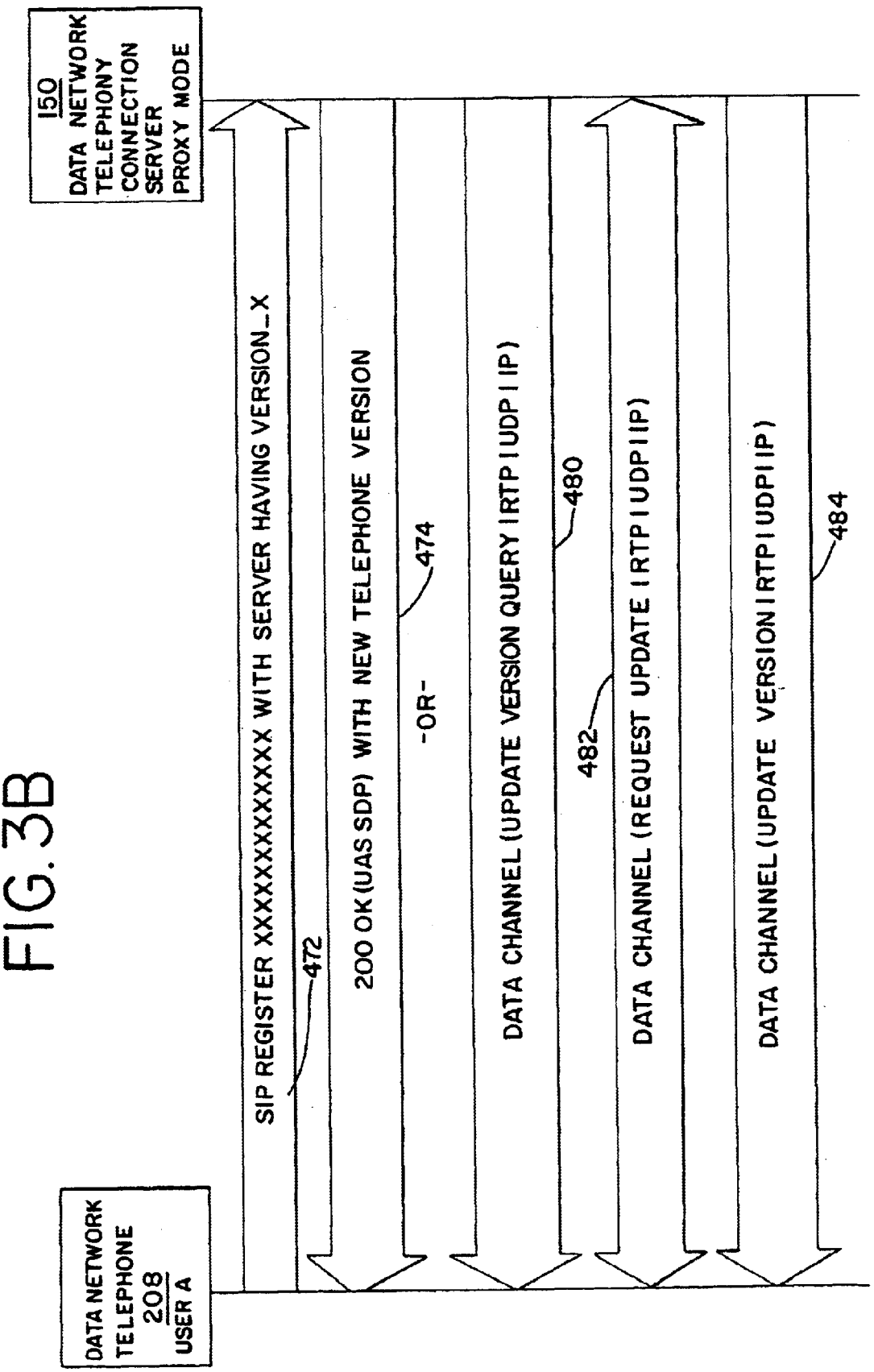
FIG. 3B is a block diagram showing one example of the interaction between components in the embodiment shown in FIG. 4A to update the data network telephone version.

FIG. 3A shows the data network telephone 208 for User A begin the registration process. User A's telephone 208 may be brand new, in which case, the process described with reference to FIGS. 3A–3D illustrates the ease with which the data network telephone 208 may be installed and used immediately. When User A connects the data network telephone 208 to the network 206 (NOTE: connection may be through an access network), the data network 208 uses its MAC address as an initial telephone identifier. The data network telephone 208 retrieves an IP address using a DHCP Discover message exchange, shown at 271, with a DHCP server 161.

The data network telephone 208 then sends a registration message as shown at 273. In a preferred embodiment, the registration message includes a temporary user identifier (e.g. "xxxxxxxxxxxxxx") and a version identifier that identifies the current version of the configuration of the telephone 208. FIG. 3B shows a sample registration request at 472 in a message flow diagram.

Referring back to FIG. 3A, the telephony connection server 150a may respond to the registration message at 273 with a response message as shown at 275. The message at 275 includes an auto-configuration command which forces the data network telephone 208 to implement a new configuration. The new configuration may be an update to the current version identified by the current version identifier. FIG. 3B shows a sample of the auto-configuration response at 474. In a preferred embodiment, the auto-configuration message is communicated in the message body of a SIP response message.

The response message at 275 in FIG. 3A may also comprise an exchange of messages using a data channel. FIG. 3B shows a first data channel message 480 having a query to the user in TCP transmitted as TCP/IP. It is to be understood that any other protocol may be used. The message may be formatted for display on the data network telephone 208, as voice over data in a voice mail session, or any other manner conforming to the user interface capabilities of the telephone 208. The user may respond by saying "Yes"/"No", selecting a menu item by touching the screen, pressing a yes/no button, or any other manner conforming to the user interface capabilities of the telephone 208.

The user's response is communicated in a second data channel 482 to the network telephony connection server 150a. If the response was a "Yes" such that the user wants the configuration of the data network telephone 208 updated, the network telephony connection server 150a responds with the updated version at 484.

Referring to FIG. 3C, the data network telephone 208 is shown as having been registered. The data network telephone 208 is shown configured with a phone number (user identifier), a service provider logo (xyz) and a hotlink, or display button programmed to dial customer service at 116 for the service provider. The service provider host 160 may configure the data network telephone with a full set of features, such as from those listed above, to allow the user to make full use of the data network telephone 208.

In an alternative embodiment, the registration process leaves the data network telephone 208 with a rudimentary configuration barely able to make any telephone calls. For example, the process may leave the data network telephone 208 capable of making only one call, to customer service for a user controlled provisioning of the system. The user may also provision the telephone 208 using a connection to the service provider's web page.

As shown in FIG. 4A, the user at data network telephone 208 makes a call at 281 to the service provider server 120 with its user identifier (xxxxxxxxxxxxxx), and a command to request service provisioning. A provisioning function, in response to the telephone call at 281, establishes a data connection 283 to perform the transfer (which may be with voice over data signals) of information. The service provider server 120 may send a form, or present an order screen 316, at the telephone requesting information from the user. The user may also use a workstation and connect at 287 to a web page 451 at the service provider server 120 and enter the information at a web page order screen 317. The information requested in both the order screen 316 and the web page order screen 317 is illustrated in FIG. 4B. One of ordinary skill in the art will appreciate that the web page order screen 317 is illustrated as an example of the type of information requested during a provisioning session. More or less information may be requested. For example, the user may be prompted to enter a physical location 317' of the data network telephone.

Referring to FIG. 4C, when the user has entered the data requested in the order screen, the service provider server 120 leaves a ready display 416 at the data network telephone 208 indicative of the type of configuration provided by the provisioning process. The service provider server 120 may also leave a confirmatory message 417 on the workstation (or on the data network telephone, either on the display or by voice) indicating what happens next. FIG. 4D shows an example of such a confirmatory message. Once the user responds to the email, the data network telephone 208 is ready for use.

The service provider server 120 also builds and stores in the service provider database 122 a user account 455 for the user as shown in FIG. 4A.

3. A Telephone Call

Figure 5:
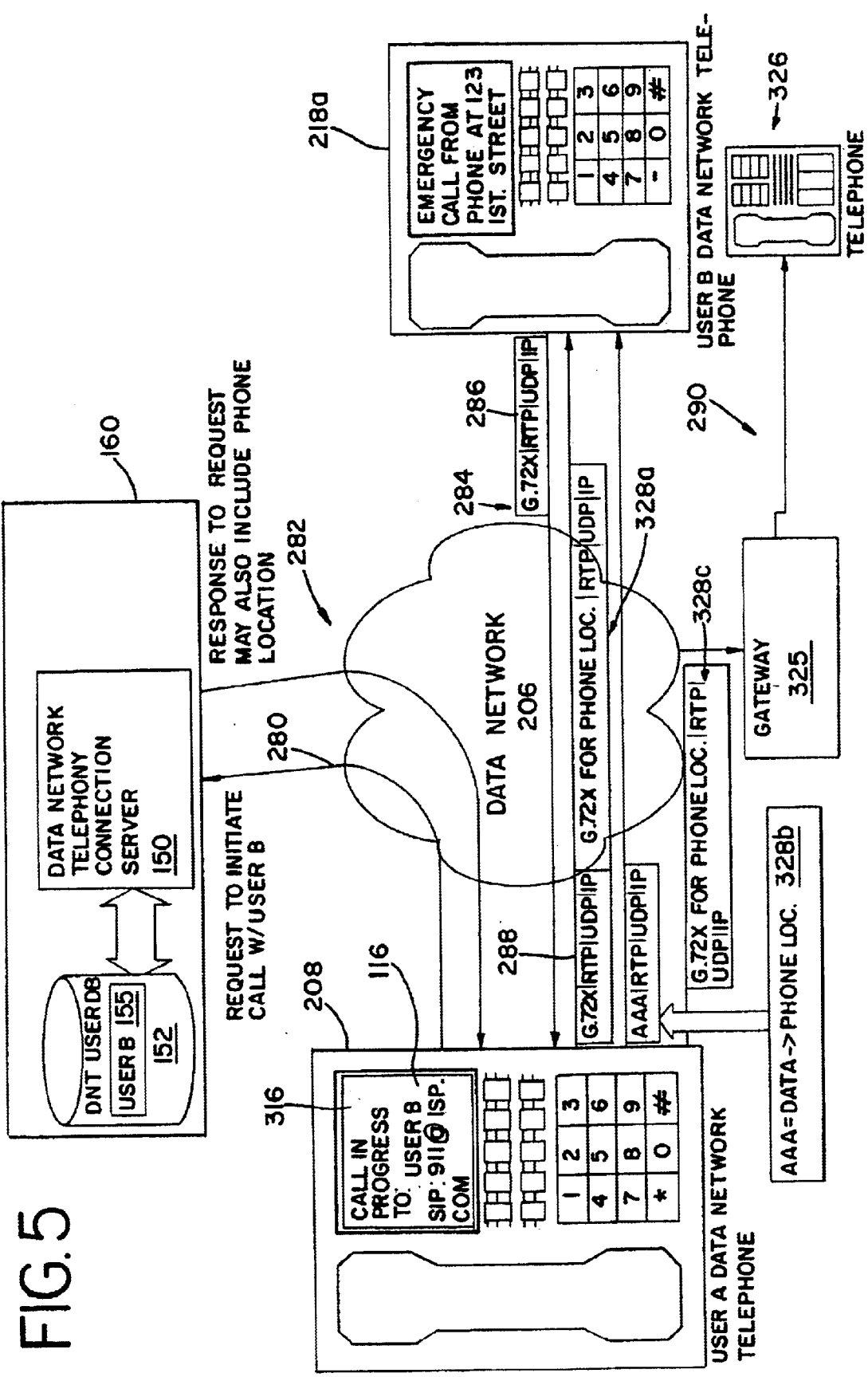
FIG. 5 is a block diagram showing the interaction between components in accordance with an example of a system and method for communicating by data network telephone in the data network telephony system in FIG. 2A.

FIG. 5 shows the interaction between the components in FIG. 2A in performing a telephone call by User A to an emergency dispatch center (User B). As shown in FIG. 5, a telephony service provider (e.g. ISP) provides telephone service using the host 160. The telephony service provider may also provide data connectivity services and other services relating to communication (e.g. advertising) on the data network 206. With User A and User B registered with network telephony connection servers 150a,b respectively, the telephony connection server 150b operates as a proxy server (e.g. as a SIP proxy server) for User B's data network telephone 218. When other users, such as User A, attempt to call User B, the call setup will be made through the telephony connection server 150b.

As shown in FIG. 5, User A initiates a telephone call from User A's data network telephone 208 to the data network telephone 218 belonging to the emergency dispatch center. User A begins the telephone call by dialing the emergency dispatch center's user identifier, shown in the display 116 as a SIP example of '911' using the keypad 118 (or a PID, or a speed dial key, or using any other manner). The data network telephone 208 sends a request to initiate a call to the emergency dispatch center at 280 to the data network telephony connection 150b providing service to the emergency dispatch center. The request to initiate a call to the emergency dispatch center at 280 includes the emergency dispatch center's user identifier as the callee, User A's user identifier as the caller and the protocols supported by User A's data network telephone 208.

The telephony connection server 150b sends the request to the data network telephone 218 identified in the user database 152b as belonging to the emergency dispatch center, preferably, in accordance with its role as a proxy server, and preferably as defined in the SIP protocol. The data network telephone 218 responds with a response message (not shown in FIG. 5) to the telephony connection server 150b. The telephony connection server 150b receives the response message and sends the response message to User A's data network telephone 208 as shown at 282.

User A's data network telephone 208 receives the response message and may prepare an acknowledgement message if called for by the protocol (e.g. the SIP protocol).

User A's data network telephone 208 also establishes a voice over data channel 284 to permit communication between User A and the emergency dispatch center. The voice over data channel 284 is preferably a data communications channel in which voice signals that have been converted to digital information are being carried as data messages in accordance with a selected protocol. The data messages include the emergency dispatch center's message 286 and User A's messages 288 as shown in FIG. 5. The emergency dispatch center's message 286 and User A's message 288 both include an IP protocol component, a UDP component, an RTP component and a G.711 component. The voice over data channel 284 may also include location information data packets 328a as voice signals for communicating the location information in-band with the voice conversation. A dispatcher responding to the telephone call at the data network telephone 218 at the emergency dispatch center hears an audio message containing the location information and may send help without any action by User A.

In addition, User A's data network telephone 208 may initiate a separate data communication channel at 328b to communicate the location information as data out-of-band. The data is shown in the packet at AAA and may be sent in any suitable data format, such as text. The data may appear on the display of the emergency dispatch center data network telephone 218. User A's data network telephone 208 may also send a voice data packet 328c to a gateway 325 for communication to a PSTN-based voice communication device 326 at the emergency dispatch center. Location information can also be provided during call setup, not just during after the connection has already been established. For example, as shown at 282, the SIP server may include the location information in the SIP reply message.

The IP protocol component permits routing of the messages 286, 288 in accordance with an Internet Protocol (e.g. IPv4, IPv6, etc.). The UDP component permits transport as a User Datagram in a connection-less environment in accordance with the User Datagram Protocol (UDP). The RTP component is the chosen format for communicating the voice signals as data. The G.711 component indicates how the voice signals, once extracted from the RTP component are to be processed to produce audio. The G.711 indication represents that the voice signals may conform to ITU-T Recommendation G.711. The voice signals may also conform to ITU-T Recommendation G.721, ITU-T Recommendation G.722, ITU-T Recommendation G.723, ITU-T Recommendation G.723.1, ITU-T Recommendation G.728 or ITU-T Recommendation G.729 or to any other suitable protocol.

One of ordinary skill in the art will appreciate that the voice over data channel 284 may be implemented using different protocols than the ones shown in FIG. 5. Moreover, when the signaling protocol used to establish the telephone call permits negotiation of supported protocols as is done with the preferred SIP protocol, the voice over data channel 284 may be asymmetrical; that is, User A's messages 288 may be different from User B's messages 286.

The telephone call carried out over the voice over data channel 284 proceeds until one or both users terminate the call. During termination or teardown of the call, the telephony connection server 150b performs in accordance with the selected session protocol such as the SIP protocol.

FIGS. 3A–5 show systems and methods for registering and auto-configuring a data network telephone 208 in accordance with embodiments of the present invention. Those of ordinary skill in the art will appreciate that the systems and methods described above are examples. Other embodiments may fall within the scope of the claims.

Figure 6:
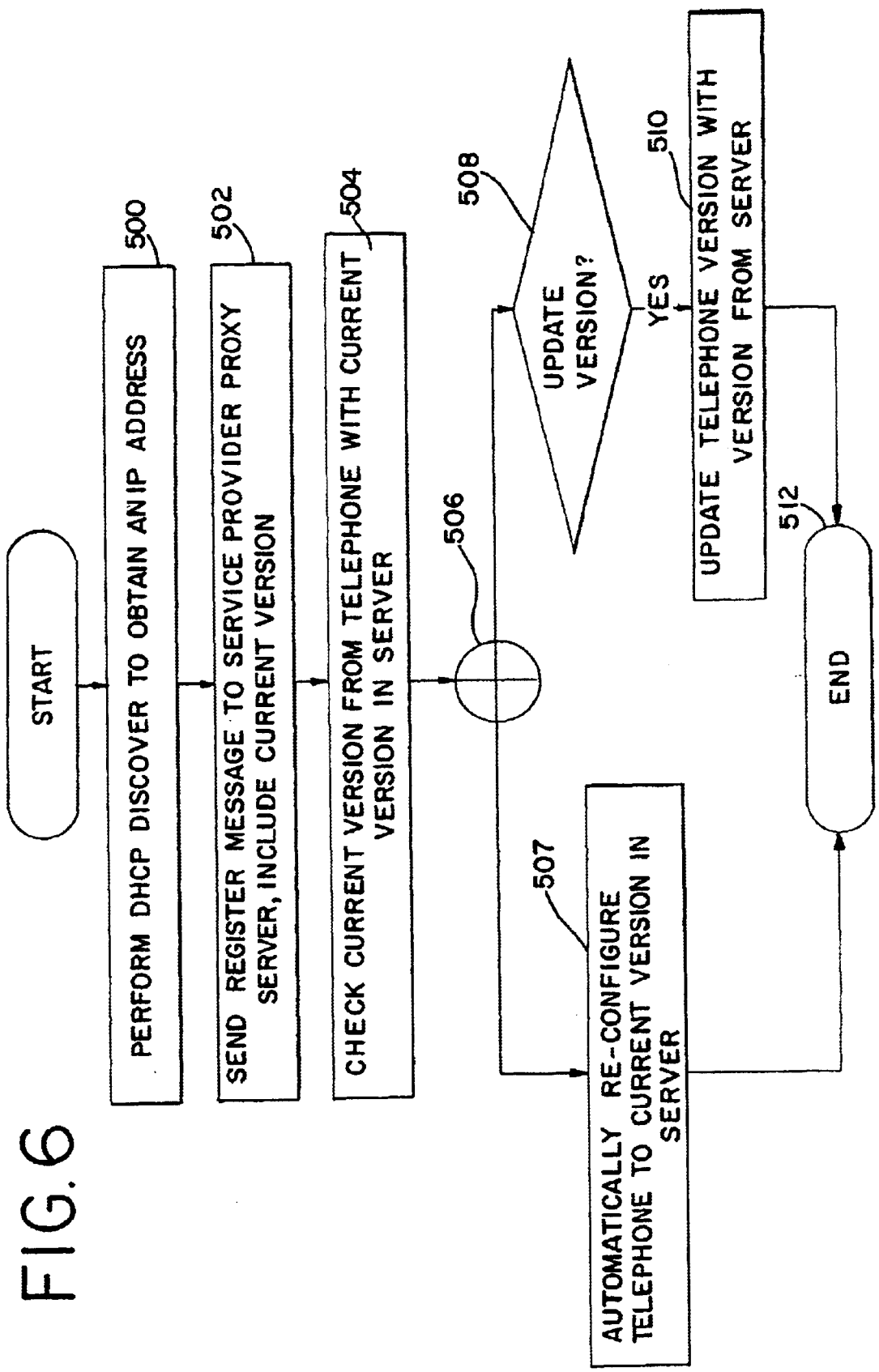
FIG. 6 is a flowchart showing an example of a method for registering a data network telephone using the data network telephony system of FIG. 1.

D. Methods For Providing Registration and Provisioning of a Data Network Telephone Using A Data Network Telephony System FIGS. 6–8 illustrate methods for providing registration and provisioning for a data network telephone that may be performed using any suitable data network telephony system. FIG. 6 is a flowchart showing a method of configuring a data network telephone by registering for service with a service provider. As shown at step 500 in FIG. 6, a data network telephone starts by obtaining an IP address from a DHCP server. At step 502, a request to register message is sent to a service provider server. The service provider server may have a designated default proxy server to use, or may provide the appropriate server with a call management protocol and/or registration server. In the request to register message, the data network telephone includes a current version of the telephone configuration as shown at step 502. The version of the telephone configuration may include different combinations of the features listed above in Table A.

At step 506, the service provider server 120 (FIG. 1) checks the telephone version with the latest version available. An OR step 506 in the flowchart of FIG. 6 indicates that alternative steps may be taken. At step 507, the service provider server 120 may automatically re-configure the data network telephone. Alternatively, the service provider server may query the user to determine whether to upgrade to a new version at decision block 508. A yes response to the query leads to step 510 to re-configure the data network telephone.

One advantage of registering in the manner shown in FIG. 6 is that a full-function feature laden configuration of the data network telephone is possible using a register request.

FIG. 7 is a flowchart that shows a method for registering the data network telephone with partial or low-level service so that the user may provision the data network telephone as a completely personalized data network telephone. At step 600 in FIG. 7, the data network telephone requests an IP address from a DHCP server. The request to register is sent at step 602 to the default proxy server. At step 604, the user proceeds to a method for provisioning the data network telephone.

FIG. 8 shows a preferred method for provisioning the data network telephone. At step 700, the user connects to the service provider's web page for providing user account information. At step 702, the user enters billing information. At step 704, the user enters user-selectable user identifiers, passwords, email identifiers, telephone location etc. At step 706, the user selects features that the user would like to add, and at step 708, the account information is submitted. A confirmatory message and email is received at step 710. When the user responds to the email at step 712, the data network telephone may be used.

While the invention has been described in conjunction with presently preferred embodiments of the invention, persons of skill in the art will appreciate that variations may be made without departure from the scope and spirit of the invention. For example, the access networks shown in FIG. 2A may comprise any other suitable type of local area network or service infrastructure.

In addition, protocols of various types are referenced throughout. While preferred and alternative embodiments may implement selected protocols, any suitable replacement protocol not mentioned, or any function not part of a protocol used to replace a corresponding function from a protocol may be implemented without departing from the scope of the invention.

This true scope and spirit is defined by the appended claims, interpreted in light of the foregoing.

We claim:

1. A system comprising:
    at least one data network telephone connected to a data network operable to communicate on a plurality of data communications channels, the data network telephone being operable to communicate voice signals as data packets on a voice over data channel with a voice communication device, the voice over data channel being one of the plurality of data communications channels on the data network containing packetized voice signals;
    the data network telephone comprising a memory having a telephone location identifier to identify the location of the data network telephone and a location information transmitter operable to send the telephone location identifier to the voice communication device; and a service provider server connected to the data network, the service provider server operable to establish a user interactive connection, to obtain a telephone location from the user, and to configure the data network telephone with a configuration including the telephone location to store in the memory as the telephone location identifier.

2. The system of claim 1 wherein:

the telephone location identifier comprises a plurality of voice signals corresponding to a voice message containing the telephone location; and wherein:
   the location information transmitter sends the telephone location identifier in the voice over data channel.

3. The system of claim 1 wherein:

the telephone location identifier comprises a plurality of data signals corresponding to a data message containing the telephone location; and wherein:
   the data network telephone creates a data channel to communicate data to the voice communication device; and wherein:
      the location information transmitter sends the telephone location identifier in the data channel.

4. The system of claim 1 wherein:

the voice communication device is a second data network telephone operable to communicate on the voice over data channel.

5. The system of claim 1 wherein:

the voice communication device is a public switched telephone network telephone operable to communicate over the voice over data channel via a gateway that converts the voice signals on the voice over data channel to a PSTN telephone signal.

6. The system of claim 1 wherein:

the voice communication device is an emergency dispatch system operable to receive the telephone location identifier and to send emergency units to the telephone location.

7. A voice communication device comprising:

a network interface to connect to a data network to communicate on a plurality of data communications channels, the voice communication device being operable to communicate voice signals as data packets on a voice over data channel with a second voice communication device, the voice over data channel being one of the plurality of data communications channels on the data network containing packetized voice signals;

a memory having a telephone location identifier to identify the location of the voice communication device and a location information transmitter operable to send the telephone location identifier to the second voice communication device; and a registration function operable to communicate with a service provider server connected to the data network to configure the voice communication device to obtain a telephone location, and to configure the voice communication device with a configuration including the telephone location to store in the memory as the telephone location identifier.

8. The voice communication device of claim 7 wherein:

the telephone location identifier comprises a plurality of voice signals corresponding to a voice message containing the telephone location; and wherein:
   the location information transmitter sends the telephone location identifier in the voice over data channel.

9. The voice communication device of claim 7 wherein:

the telephone location identifier comprises a plurality of data signals corresponding to a data message containing the telephone location; wherein:
   the data network telephone creates a data channel to communicate data to the second voice communication device; and wherein:
      the location information transmitter sends the telephone location identifier in the data channel.

10. A method of configuring a data network telephone for service comprising the steps of:

receiving a request to configure the data network telephone from the user;

presenting a user feature request form prompting the user to select features and to enter a physical location of the data network telephone;

setting a user account in accordance with the selected features; and sending a configuration message to the data network telephone, the configuration message including a telephone location identifier to store in the data network telephone.

11. The method of claim 10 further comprising the step of sending a confirming message displaying the user selected features.

12. A service provider server comprising:

a network interface for communicating over at least one data communications channel;

an accounts database for storing user records and accessing a user account in response to a registration request made by a user, the user account having a user telephone service account for using a data network telephone;

a provisioning function to provide a feature request form to a user on one of the data communications channels, the feature request form being operable to receive user input to select at least one feature enhancement and a telephone location;

a setup function to allow the user to set options for the user telephone service account, the options being: a user identifier, a telephone identifier, a telephone location identifier, a user's name, a plurality of user's telephony service features, a speed dial program, a function using PDA connectivity, and a packaged configuration; and a service configuration function to allow the user to configure the user telephone service account according to the selected feature enhancements, the telephone location, and the set options, the service configuration function sending a message to the data network telephone indicating a user identifier and the telephone location, the message further indicating to activate the service enhancements and the set options, and to store the telephone location.

13. A method for transmitting location information of a data network telephone during a telephone connection comprising the steps of:

detecting a voice over data communication channel connected to a second voice communication device;

retrieving a telephone location identifier voice message from a memory element in the data network telephone;

adding the telephone location identifier voice message to a data packet; and communicating the data packet to the second voice communication device.

* * * * *